United States Patent
Han et al.

(10) Patent No.: US 10,152,625 B2
(45) Date of Patent: Dec. 11, 2018

(54) METHOD FOR PROVIDING CONTROL FUNCTION USING FINGERPRINT SENSOR AND ELECTRONIC DEVICE THEREOF

(71) Applicant: Samsung Electronics Co., Ltd., Suwon-si, Gyeonggi-do (KR)

(72) Inventors: Yong-Gil Han, Gumi-si (KR); Chul-Hyung Yang, Gumi-si (KR); Jeong-Seob Kim, Daegu (KR); Gyu-Cheol Choi, Yongin-si (KR); Seung-Eun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 14/601,640

(22) Filed: Jan. 21, 2015

(65) Prior Publication Data
US 2015/0205993 A1 Jul. 23, 2015

(30) Foreign Application Priority Data
Jan. 22, 2014 (KR) ........................ 10-2014-0007876

(51) Int. Cl.
*G06K 9/00* (2006.01)
*G06F 3/0488* (2013.01)
*G06F 21/32* (2013.01)

(52) U.S. Cl.
CPC ....... *G06K 9/00013* (2013.01); *G06F 3/0488* (2013.01); *G06F 21/32* (2013.01)

(58) Field of Classification Search
CPC ...... G06F 21/36; G06F 21/83; G06F 3/04847; G06F 3/0236; G06F 21/31; G06F 17/30265; G06F 11/3476; G06F 2200/1614; G06F 3/04883; G06F 2221/2107; H04N 2201/3274; H04N 5/772; G06K 9/00006; G06K 9/00013; G06K 9/00087; G06Q 20/3274; H04L 63/0861

See application file for complete search history.

(56) References Cited

U.S. PATENT DOCUMENTS

| | | | | |
|---|---|---|---|---|
| 5,577,125 | A * | 11/1996 | Salahshour | G06F 3/0486 380/287 |
| 9,621,628 | B1 * | 4/2017 | Benton | H04L 67/06 |
| 2009/0059034 | A1 * | 3/2009 | Rothschild | G06F 17/30265 348/231.3 |
| 2009/0268056 | A1 * | 10/2009 | Wu | H04N 5/772 348/231.2 |
| 2010/0302409 | A1 * | 12/2010 | Matas | H04N 5/772 348/231.99 |
| 2013/0026232 | A1 * | 1/2013 | Zhou | G06Q 20/3274 235/380 |

(Continued)

FOREIGN PATENT DOCUMENTS

| | | | | |
|---|---|---|---|---|
| CN | 103024158 A | * | 4/2013 | G06K 9/00 |
| JP | 2010-226506 A | | 10/2010 | |

(Continued)

*Primary Examiner* — Robert Michaud
(74) *Attorney, Agent, or Firm* — Jefferson IP Law, LLP

(57) ABSTRACT

An apparatus and a method for providing a control function using a fingerprint sensor in an electronic device are provided. The method includes collecting information based on occurrence of an event, detecting a touch input on a fingerprint sensor, and performing a control function for the information based on the touch input on the fingerprint sensor.

18 Claims, 28 Drawing Sheets

(56) References Cited

U.S. PATENT DOCUMENTS

| | | | | |
|---|---|---|---|---|
| 2014/0173717 A1* | 6/2014 | Davis | .................... | G06F 21/36 |
| | | | | 726/18 |
| 2014/0277843 A1* | 9/2014 | Langlois | ............ | H04M 1/6091 |
| | | | | 701/2 |
| 2014/0359758 A1* | 12/2014 | Lee | ........................ | G06F 21/30 |
| | | | | 726/19 |
| 2015/0135108 A1* | 5/2015 | Pope | ................. | G06K 9/00006 |
| | | | | 715/767 |
| 2015/0304321 A1* | 10/2015 | Wong | .................... | G06F 21/32 |
| | | | | 726/5 |

FOREIGN PATENT DOCUMENTS

| | | |
|---|---|---|
| KR | 10-2006-0034452 A | 4/2006 |
| KR | 10-2006-0060875 A | 6/2006 |

\* cited by examiner

METHOD FOR PROVIDING CONTROL FUNCTION USING FINGERPRINT SENSOR AND ELECTRONIC DEVICE THEREOF

CROSS-REFERENCE TO RELATED APPLICATION(S)

This application claims the benefit under 35 U.S.C. § 119(a) of a Korean patent application filed on Jan. 22, 2014 in the Korean Intellectual Property Office and assigned Serial number 10-2014-0007876, the entire disclosure of which is hereby incorporated by reference.

TECHNICAL FIELD

The present disclosure relates to an apparatus and a method for providing a control function using a fingerprint sensor in an electronic device. More particularly, the present disclosure relates to an apparatus and a method for providing a control function using a fingerprint sensor in an electronic device.

BACKGROUND

With the development of information and communication technology and semiconductor technology, various electronic devices are developing into multimedia devices which provide various multimedia services. For example, the electronic device may provide multimedia services, such as a speech telephony service, a video telephony service, a messenger service, a broadcast service, a wireless Internet service, a camera service, a music replay service, and the like.

As described above, electronic devices may provide various multimedia services. However, users of electronic devices increasingly demand new services through electronic devices. Accordingly, electronic devices require services for fulfilling the users' demands.

Therefore, a need exists for an apparatus and a method for providing a control function using a fingerprint sensor in an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for providing a control function using a fingerprint sensor in an electronic device.

Another aspect of the present disclosure is to provide an apparatus and a method for providing a security function of a content using a fingerprint sensor in an electronic device.

Another aspect of the present disclosure is to provide an apparatus and a method for encrypting at least some area of a content in an electronic device.

Another aspect of the present disclosure is to provide an apparatus and a method for setting a security function for at least some area of a content using a fingerprint sensor in an electronic device.

In accordance with an aspect of the present disclosure, a method for performing a control function in an electronic device is provided. The method includes collecting information based on occurrence of an event, detecting a touch input on a fingerprint sensor, and performing a control function for the information based on the touch input on the fingerprint sensor.

In accordance with another aspect of the present disclosure, a method for encrypting a content in an electronic device is provided. The method includes determining whether a touch input on a fingerprint sensor is detected while a content is being generated, and encrypting at least some area of the content in response to the touch input on the fingerprint sensor.

In accordance with another aspect of the present disclosure, an electronic device is provided. The electronic device includes a fingerprint sensor, and a processor configured to collect information based on occurrence of an event, to detect a touch input on the fingerprint sensor, and to perform a control function for the information based on the touch input.

In accordance with another aspect of the present disclosure, an electronic device is provided. The electronic device includes a fingerprint sensor, and a processor configured to detect a touch input on the fingerprint sensor while generating a content, and to encrypt at least some area of the content in response to the touch input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
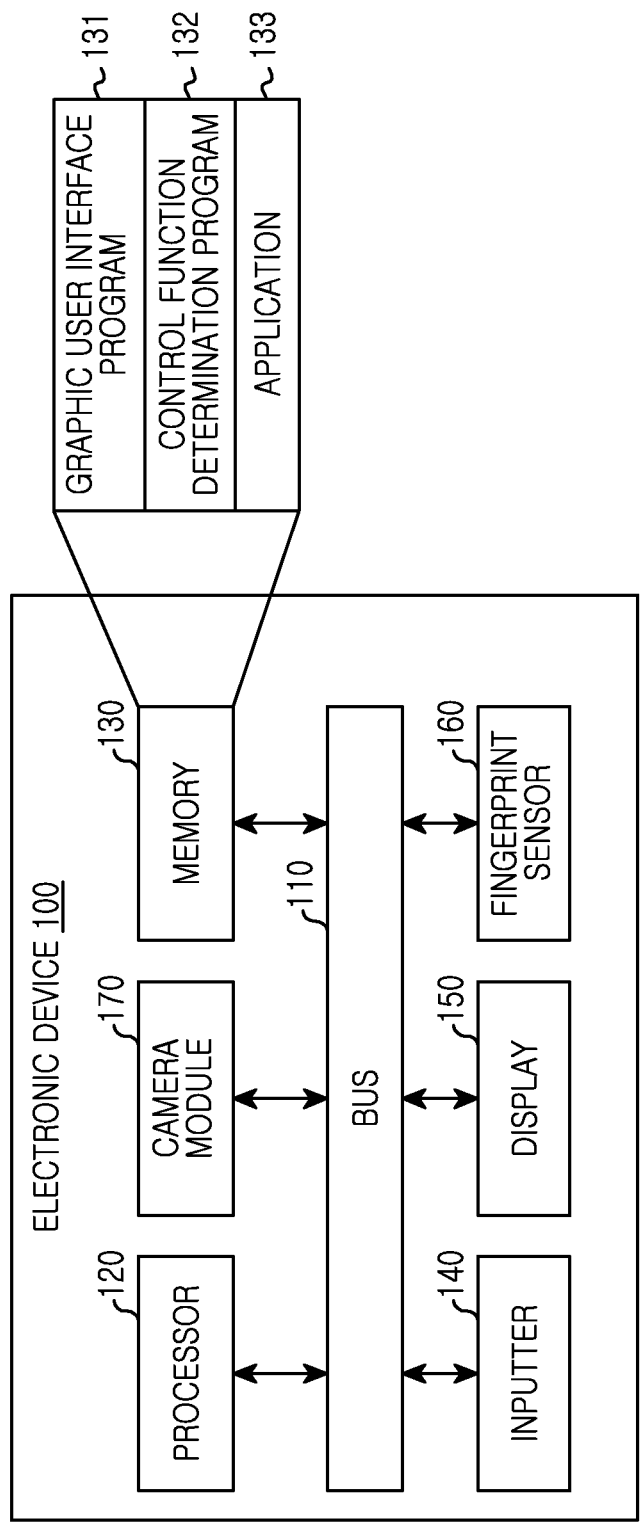
FIG. 1 illustrates a block diagram showing an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The electronic device according to embodiments of the present disclosure may include one or more of a smartphone, a tablet personal computer (PC), a mobile phone, a video phone, an electronic book reader, a desktop PC, a laptop PC, a netbook computer, a Personal Digital Assistant (PDA), a Portable Multimedia Player (PMP), a Motion Pictures Expert Group (MPEG-1 or MPEG-2) Audio Layer 3 (MP3) player, an accessory, an electronic appcessory, a camera, a wearable device, a wrist watch, a refrigerator, an air conditioner, a cleaner, an artificial intelligence robot, a TV, a Digital Video Disk (DVD) player, a stereo, an oven, a microwave oven, a washing machine, an electronic bracelet, an electronic necklace, an air cleaner, an electronic album, a medical device, a navigation device, a satellite signal receiver, an Event Data Recoder (EDR), a Flight Data Recoder (FDR), a set-top box, a TV box, an electronic dictionary, an automotive infotainment device, electronic equipment for ship, avionics, a security device, electronic clothing, an electronic key, a camcorder, a game console, a Head-Mounted Display (HMD), a flat panel display device, an electronic album, a part of furniture or a building/a structure including an electronic device, an electronic board, an electronic signature receiving device, and a projector, which include a fingerprint sensor. In addition, it is obvious to an ordinary skilled person in the related art that the electronic device according to various embodiments of the present disclosure is not limited to the above-mentioned devices.

FIG. 1 illustrates a block diagram of an electronic device according to an embodiment of the present disclosure.

Referring to FIG. 1, an electronic device 100 may include a bus 110, a processor 120, a memory 130, an inputter 140, a display 150, a fingerprint sensor 160, and a camera module 170. One or more of the processor 120 and the memory 130 may be provided in plural number.

The bus 110 connects the elements included in the electronic device 100 with one another and controls communications between the elements included in the electronic device 100.

The processor 120 controls the electronic device 100 to provide various services. For example, the processor 120 may decipher instructions which are received from one or more other elements included in the electronic device 100 (for example, the memory 130, the inputter 140, the display 150, the fingerprint sensor 160, and the camera module 170) through the bus 110, and may perform calculation and data processing according to the deciphered instructions.

The processor 120 controls the electronic device 100 to provide various services by executing one or more programs stored in the memory 130. For example, when the processor 120 detects a touch input on the fingerprint sensor 160 in the middle of collecting information by executing an application 133, the processor 120 may execute a control function determination program 132 to determine a control function for the collected information, or may perform the control function. The information recited herein may indicate information that a user can collect using the electronic device 100 like a photo, a moving image, and an audio signal, and may be referred to as a context. The touch on the fingerprint sensor 160 may include a swipe which is a series of operations of touching the fingerprint sensor 160 and dragging in a certain direction while still touching.

According to an embodiment of the present disclosure, when a touch input is detected through the fingerprint sensor 160 before an effective time expires from the time of detecting occurrence of a photographing event, the processor 120 may set a security function for image data or moving image data which is acquired through the camera module 170. The security function recited herein may include one or more of setting a password and storing in a security folder. For example, when a password is set for the image data or moving image data, the processor 120 may set fingerprint information detected through the fingerprint sensor 160 as a password of the corresponding data.

According to an embodiment of the present disclosure, when a touch input is detected through the fingerprint sensor 160 before an effective time expires from the time of detecting occurrence of a photographing event, the processor 120 may transmit image data or moving image data which is acquired through the camera module 170 to a cloud server. For example, the processor 120 may store the image data or moving image data transmitted to the cloud server in the memory 130 or may not store the image data or moving image data.

According to an embodiment of the present disclosure, when a touch input is detected through the fingerprint sensor 160 before an effective time expires from the time of detecting occurrence of a photographing event regarding a Quick Response (QR) code, the processor 120 may perform a payment function for a product corresponding to the QR code acquired through the camera module 170. When user's payment information for the payment function is not stored, the processor 120 may perform a payment information registration procedure for the user.

According to an embodiment of the present disclosure, when a touch input is detected through the fingerprint sensor 160 while a content is being recorded, the processor 120 may encrypt the content which is being recorded from the time of detecting the touch input through the fingerprint sensor 160. For example, the processor 120 may set fingerprint information detected through the fingerprint sensor 160 as a password of the encrypted content. When a touch input on the fingerprint sensor 160 is detected while the content is being encrypted, the processor 120 may end the encryption of the corresponding content.

According to an embodiment of the present disclosure, when a touch input which is detected through the inputter 140 or the fingerprint sensor 160 while a content is being generated is maintained during an effective time, the processor 120 may encrypt at least some area of the content. For example, the processor 120 may set at least some area of the content including a touch point as a security setting area, and may encrypt the at least some area. The processor 120 may set fingerprint information detected through the fingerprint sensor 160 as a password of the security setting area.

According to an embodiment of the present disclosure, the processor 120 may determine at least some area of a content as a security setting area based on a touch input which is detected through the inputter 140 or the fingerprint sensor 160 while the content is being generated. The processor 120 may encrypt the security setting area based on an additional touch input on the security setting area. For example, the processor 120 may set fingerprint information detected through the fingerprint sensor 160 as a password of the security setting area.

According to an embodiment of the present disclosure, when the processor 120 detects a touch input on the fingerprint sensor 160 while replaying a content, the processor 120 may execute a control function determination program 132 to perform a control function for the content which is being replayed. For example, when the processor 120 detects a touch input on the fingerprint sensor 160 while replaying a content, the processor 120 may encrypt the content which is being replayed from the time of detecting the touch input on the fingerprint sensor 160. For example, the processor 120 may set fingerprint information detected through the fingerprint sensor 160 as a password of the encrypted content. When a touch input on the fingerprint sensor 160 is detected while the content is being encrypted, the processor 120 may end the encryption of the content from the time of detecting the touch input on the fingerprint sensor 160. The content recited herein may include a moving image content, an audio content, and an E-book content.

The memory 130 may store instructions or data which is received from or generated by one or more elements included in the electronic device 100 (the processor 120, the inputter 140, the display 150, the fingerprint sensor 160, and the camera module 170).

The memory 130 stores one or more programs for services of the electronic device 100. For example, the memory 130 may include one or more of a Graphical User Interface (GUI) program 131, a control function determination program 132, and at least one application 133.

The GUI program 131 may include at least one software element for providing a user interface to the display 150 in graphics. For example, the GUI program 131 may control the display 150 to display information on an application which is driven by the processor 120. In another example, the GUI program 131 may control the display 150 to display information which is collected through the camera module 170.

The control function determination program 132 may include at least one software element for determining a control function based on touch information of the fingerprint sensor 160. For example, the control function determination program 132 may determine a control function to be performed through the processor 120 based on information which is collected at the time of detecting a touch through the fingerprint sensor 160.

The application 133 may include a software element for at least one application installed in the electronic device 100.

The inputter 140 transmits instructions or data which is generated by user's selection to the processor 120 or the memory 130 through the bus 110. For example, the inputter 140 may include one or more of a keypad including at least one hardware button and a touch panel for detecting touch information.

The display 150 displays an image, a video, or data for the user. For example, the display 150 may display information on an application which is driven by the processor 120. In another example, the display 150 may display information which is collected through the camera module 170.

The fingerprint sensor 160 generates fingerprint data corresponding to a fingerprint of a finger which is in contact with a sensor surface. For example, the fingerprint sensor 160 may generate fingerprint data corresponding to a fingerprint shape of a finger based on an amount of current which changes by contact of the finger on the sensor surface. For example, the fingerprint sensor 160 may be included in a home button or an entirety of the display 150 or at least some area of the display 150.

The camera module 170 may provide an image which is collected by photographing a subject to the processor 120. For example, the camera module 170 may include a camera sensor which converts an optical signal into an electric signal, and an Image Signal Processor (ISP) which converts an analogue image signal into a digital image signal. Here, the camera module 170 may include at least one camera module which is connected to the electronic device 100.

Although not shown, the electronic device 100 may further include a communication module for connecting communications with one or more other electronic devices or servers or one or more peripheral devices. For example, the communication module may support one or more of short-range communication protocols (for example, Wireless Fidelity (WiFi), Bluetooth, and Near Field Communication (NFC)), and network communications (for example, Internet, a Local Area Network (LAN), a Wire Area Network (WAN), a telecommunication network, a cellular network, a satellite network, and a Plain Old Telephone Service (POTS)).

In the above-described embodiment of the present disclosure, the processor 120 may determine a control function corresponding to touch information of the fingerprint sensor 160 by executing software elements stored in the memory 130 in a single module.

Figure 2:
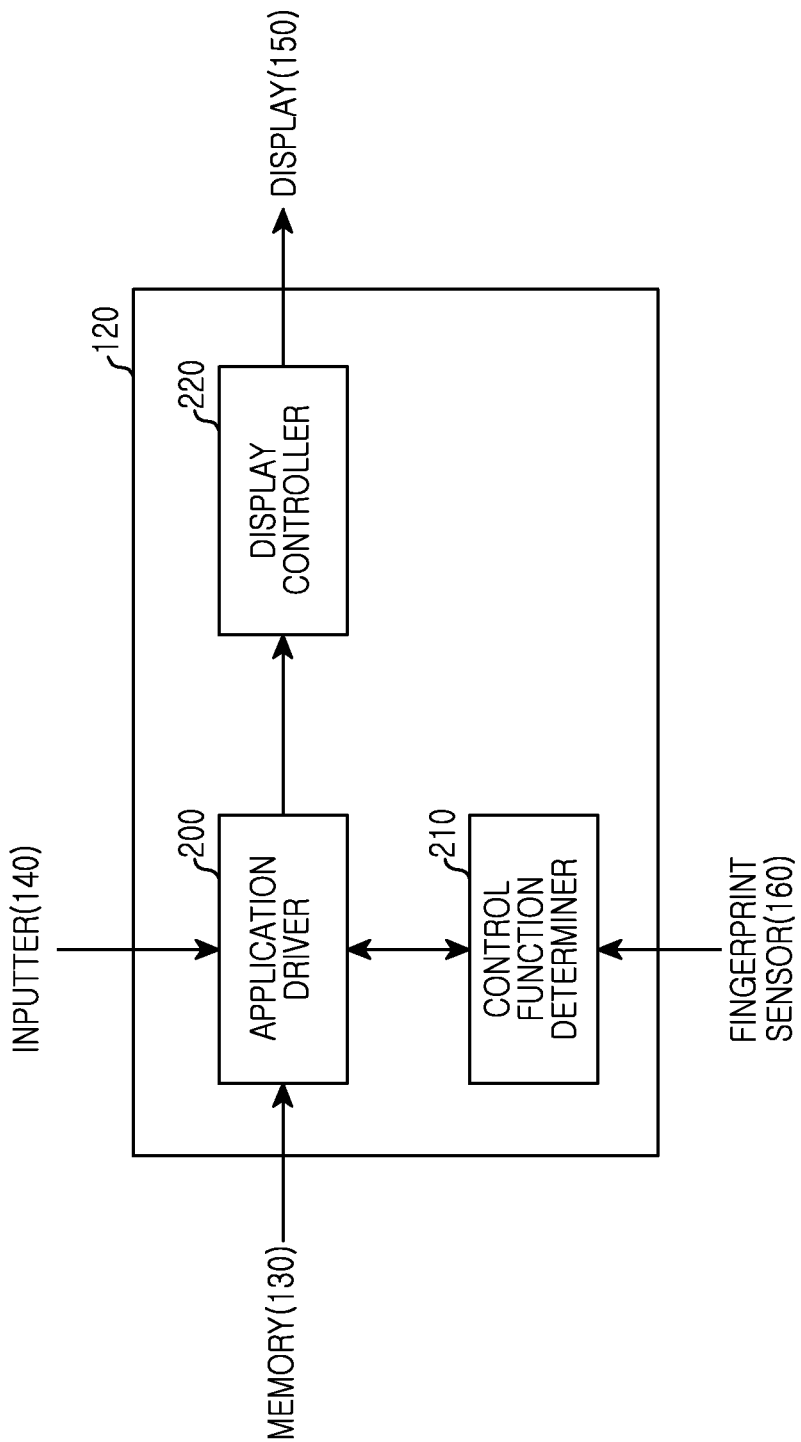
FIG. 2 illustrates a block diagram showing a processor according to an embodiment of the present disclosure.

According to another embodiment of the present disclosure, the processor 120 may be configured to include elements for determining a control function corresponding to touch information of the fingerprint sensor 160 as separate modules as shown in FIG. 2.

FIG. 2 illustrates a block diagram of a processor according to an embodiment of the present disclosure.

Referring to FIG. 2, the processor 120 includes an application driver 200, a control function determiner 210, and a display controller 220.

The application driver 200 may execute at least one application 133 stored in the memory 130 and provide a service according to the corresponding application. For example, the application driver 200 may collect information by executing the application 133. The application driver 200 may perform a control function for information which is collected based on a control function provided from the control function determiner 210. For example, the application driver 200 may replay a content by executing the application 133. The application driver 200 may encrypt at least some area of the content which is being replayed according to a control function provided from the control function determiner 210.

The control function determiner 210 may determine a control function for processing information in the application driver 200 based on touch information of the fingerprint sensor 160. For example, the control function determiner 210 may execute the control function determination program 132 stored in the memory 130 and determine a control function for processing information in the application driver 200 based on touch information of the fingerprint sensor 160.

For example, when a touch input is detected through the fingerprint sensor 160 before an effective time expires from the time of detecting occurrence of a photographing event, the control function determiner 210 may control the application driver 200 to set a security function for image data or moving image data which is acquired through the camera module 170. For example, when a password is set for the image data or moving image data, the control function determiner 210 may set fingerprint information detected through the fingerprint sensor 160 as a password of the corresponding data.

For example, when a touch input is detected through the fingerprint sensor 160 before an effective time expires from the time of detecting occurrence of a photographing event, the control function determiner 210 may control the application driver 200 to transmit image data or moving image data which is acquired through the camera module 170 to a cloud server.

For example, when a touch input is detected through the fingerprint sensor 160 before an effective time expires from the time of detecting occurrence of a photographing event regarding a QR code, the control function determiner 210 may control the application driver 200 to perform a payment function for a product corresponding to the QR code which is acquired through the camera module 170.

For example, when a touch input is detected through the fingerprint sensor 160 while a content is being recorded, the control function determiner 210 may control the application driver 200 to encrypt the content which is being recorded from the time of detecting the touch input on the fingerprint sensor 160. For example, the control function determiner 210 may set fingerprint information detected through the fingerprint sensor 160 as a password of the encrypted content. When a touch input on the fingerprint sensor 160 is detected while the content is being encrypted in the application driver 200, the control function determiner 210 may control the application driver 200 to end the encryption of the content from the time of detecting the touch input on the fingerprint sensor 160.

For example, when a touch input which is detected through the inputter 140 or the fingerprint sensor 160 while a content is being generated through the application driver 200 is maintained during an effective time, the control function determiner 210 may control the application driver 200 to encrypt at least some area of the content. The control function determiner 210 may control the application driver 200 to set at least some area of the content including a touch point as a security setting area and to encrypt the security setting area. The control function determiner 210 may set fingerprint information detected through the fingerprint sensor 160 as a password of the security setting area.

For example, the control function determiner 210 may set at least some area of a content as a security setting area based on a touch input which is detected through the inputter 140 or the fingerprint sensor 160 while the content is being generated. The control function determiner 210 may control the application driver 200 to encrypt the security setting area based on an additional touch input on the security setting area. In this case, the control function determiner 210 may set fingerprint information detected through the fingerprint sensor 160 as a password of the security setting area.

The control function determiner 210 may determine a point of time for encrypting at least some area of a content which is being replayed in the application driver 200 based on touch information of the fingerprint sensor 160. In this case, the control function determiner 210 may execute the control function determination program 132 stored in the memory 130, and may determine a point of time for encrypting at least some of a content which is being replayed in the application driver 200 based on touch information of the fingerprint sensor 160. For example, when a touch input on the fingerprint sensor 160 is detected while the application driver 200 is replaying a content, the control function determiner 210 may control the application driver 200 to encrypt the content which is being replayed from the time of detecting the touch input on the fingerprint sensor 160. In this case, the control function determiner 210 may set fingerprint information detected through the fingerprint sensor 160 as a password of the encrypted content. Meanwhile, when a touch input on the fingerprint sensor 160 is detected while the content is being encrypted in the application driver 200, the control function determiner 210 may control the application program driver 200 to end the encryption of the content from the time of detecting the touch input on the fingerprint sensor 160.

The display controller 220 controls to provide a user interface to the display 150 in graphics. In this case, the display controller 220 may control to provide the user interface to the display 150 in graphics by executing the GUI program 131 stored in the memory 130. For example, the display controller 220 may control to display information on an application which is driven by the application driver 200 on the display 150. In another example, the display controller 220 may control to display information which is collected through the camera module 170 on the display 150.

In the above-described embodiment, the electronic device 100 may determine a control function corresponding to touch information of the fingerprint sensor 160 by using the processor 120.

According to another embodiment of the present disclosure, the electronic device 100 may include a separate control module for determining a control function corresponding to touch information of the fingerprint sensor 160.

Figure 3:
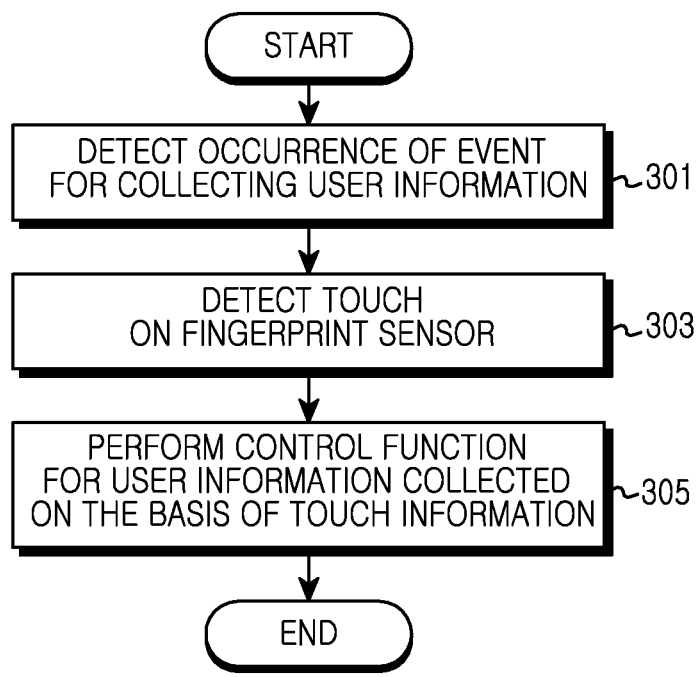
FIG. 3 illustrates a flowchart showing a procedure for providing a control function using a fingerprint sensor in an electronic device according to an embodiment of the present disclosure.

FIG. 3 illustrates a flowchart showing a procedure for providing a control function using a fingerprint sensor in an electronic device according to an embodiment of the present disclosure.

Referring to FIG. 3, the electronic device detects occurrence of an event for collecting information in operation 301. For example, the electronic device 100 may determine whether a photographing event occurs based on input information detected through the inputter 140. When the occurrence of the photographing event is detected, the electronic device 100 may acquire information (image data or moving image data) using the camera module 170.

The electronic device determines whether a touch input on the fingerprint sensor 160 is detected in operation 303. For example, the electronic device may determine whether a touch input on the fingerprint sensor 160 is detected before an effective time expires after detecting the occurrence of the event for collecting the information.

When the touch input on the fingerprint sensor 160 is detected, the electronic device perform a control function for the information which is collected in response to the occurrence of the event for collecting the information based on the touch input in operation 305. The control function recited herein may include one or more of a function of setting a security function for information, a function of transmitting information to a cloud server, and a function of paying for a product.

Figure 4:
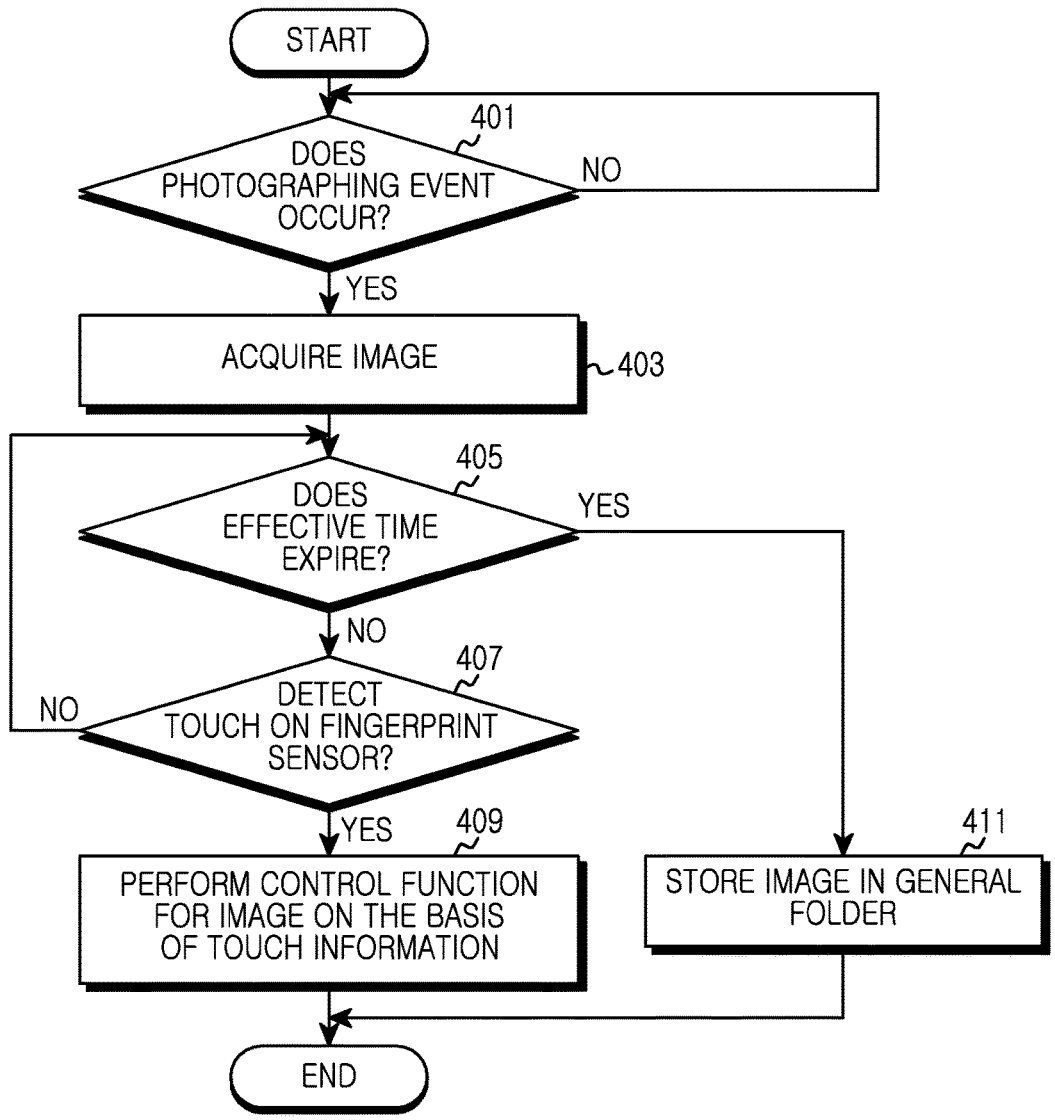
FIG. 4 illustrates a flowchart showing a procedure for providing a control function using a fingerprint sensor in an electronic device according to an embodiment of the present disclosure.
Figure 7A:
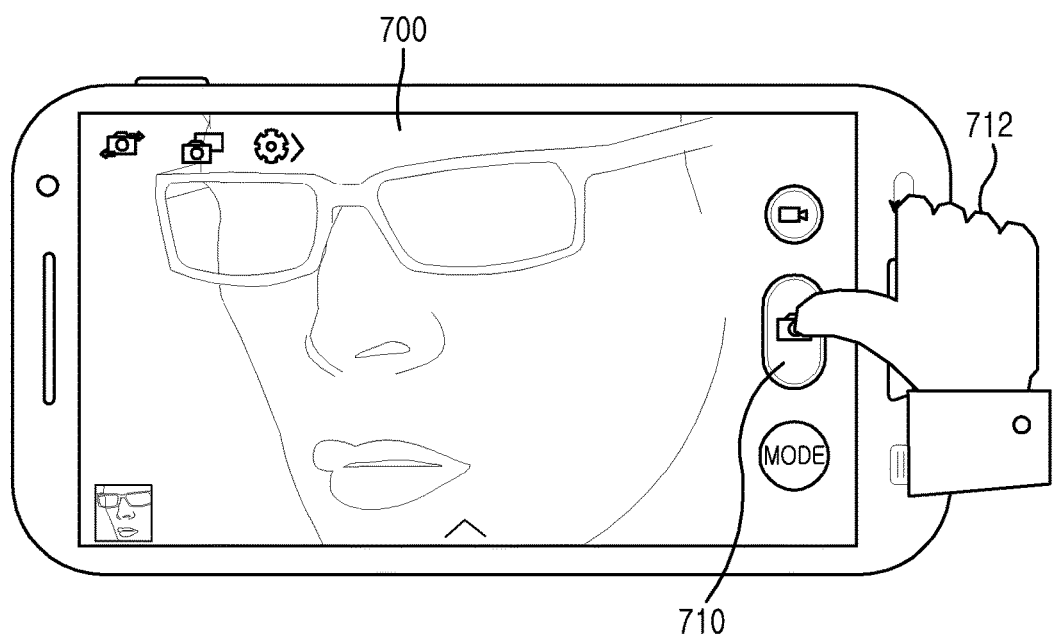
FIGS. 7A and 7B illustrate views showing a configuration for setting a security function for an image using a fingerprint sensor in an electronic device according to an embodiment of the present disclosure.
Figure 7B:
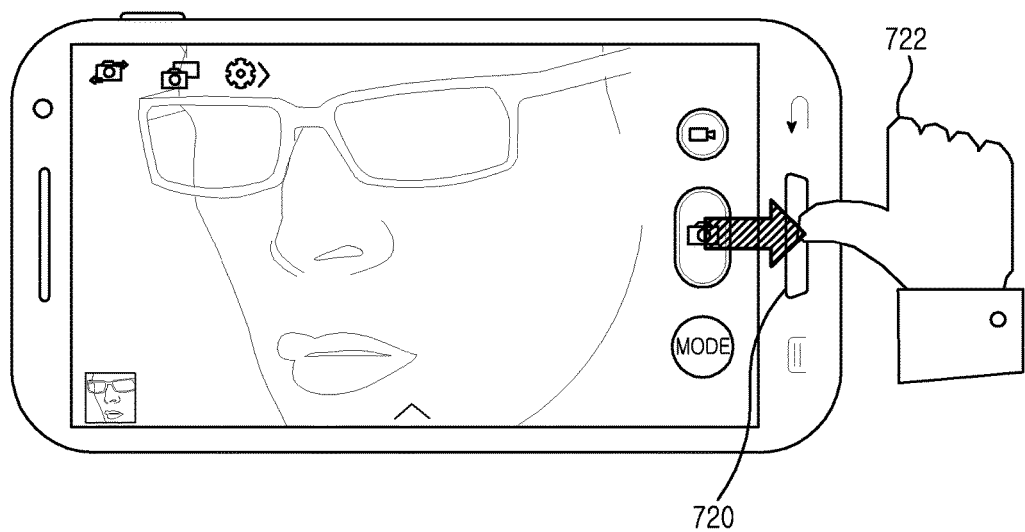
Figure 8A:
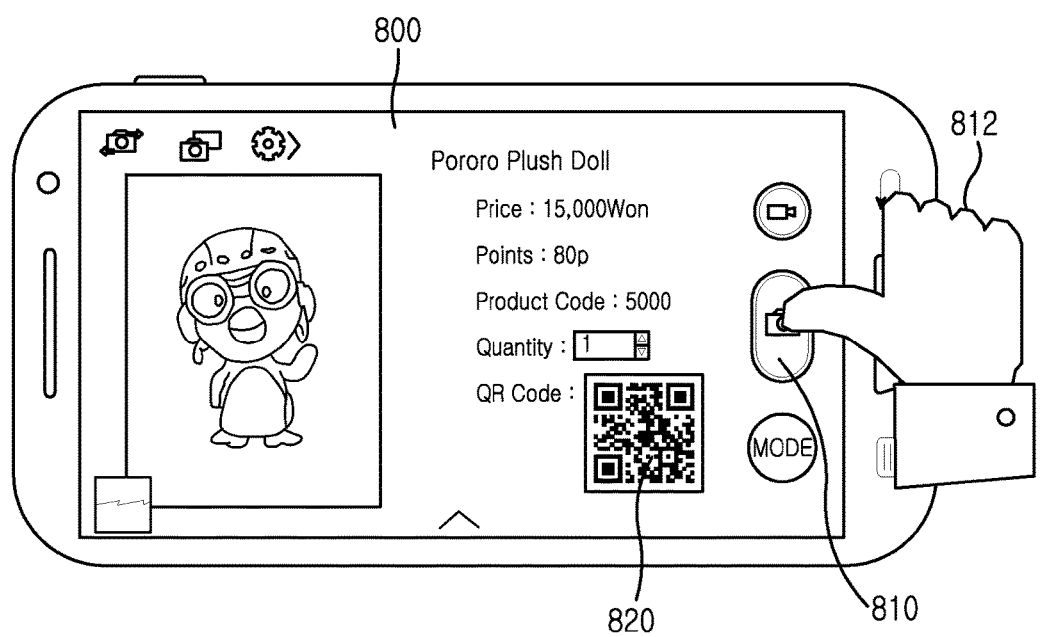
FIGS. 8A and 8B illustrate views showing a configuration for providing a payment service using a fingerprint sensor in an electronic device according to an embodiment of the present disclosure.
Figure 8B:
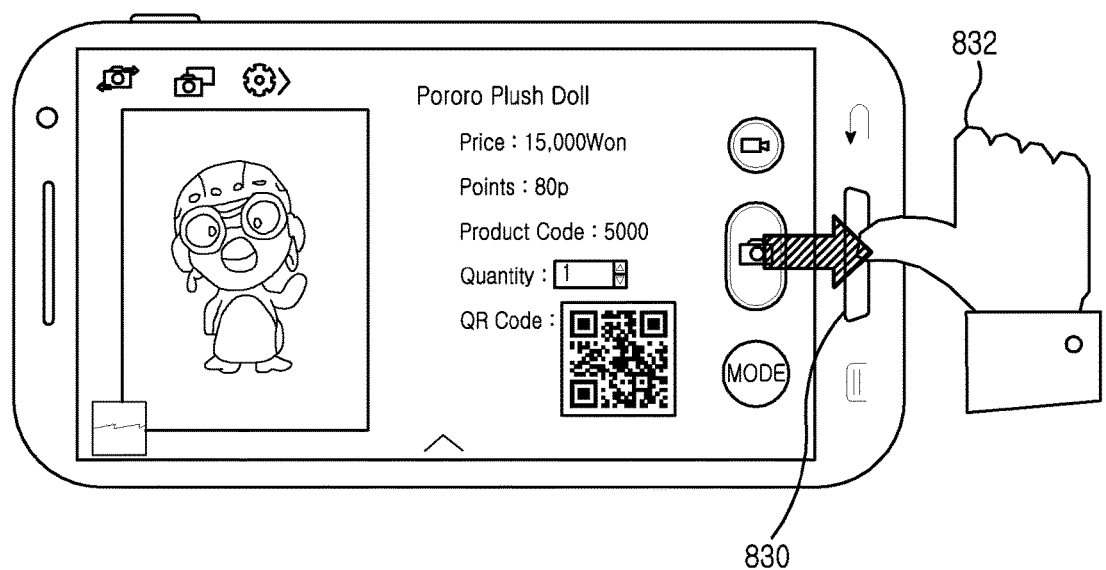
Figure 9A:
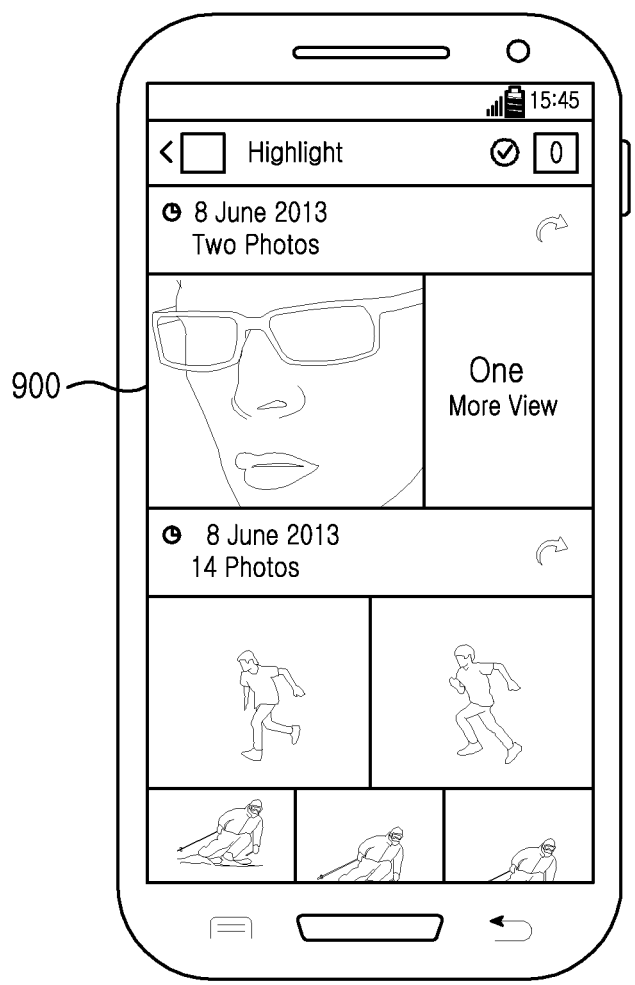
FIGS. 9A, 9B, and 9C illustrate views showing a configuration for providing a control function for an image which is set using a fingerprint sensor in an electronic device according to an embodiment of the present disclosure.
Figure 9B:
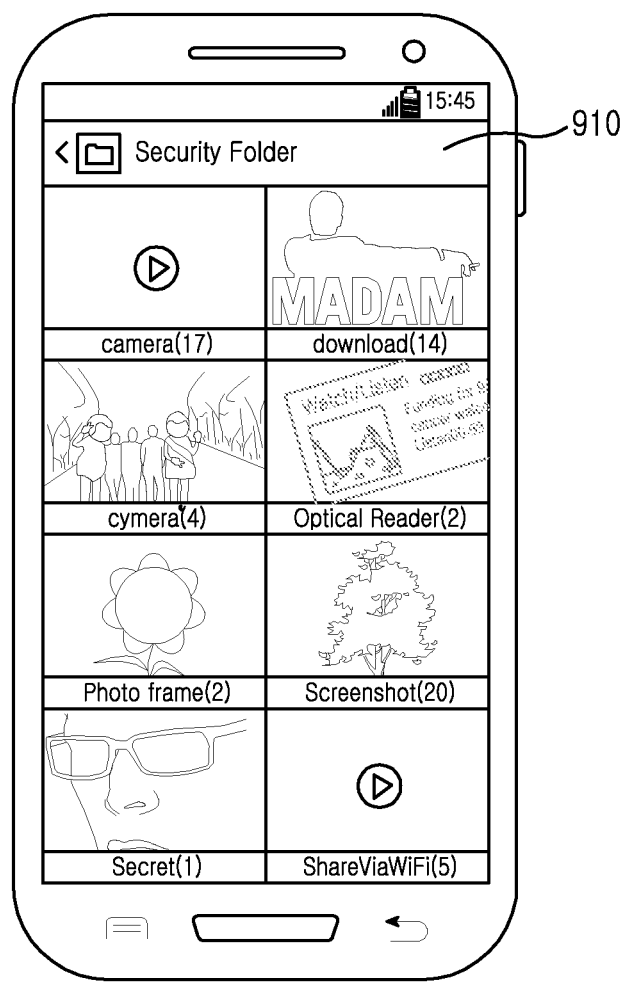
Figure 9C:
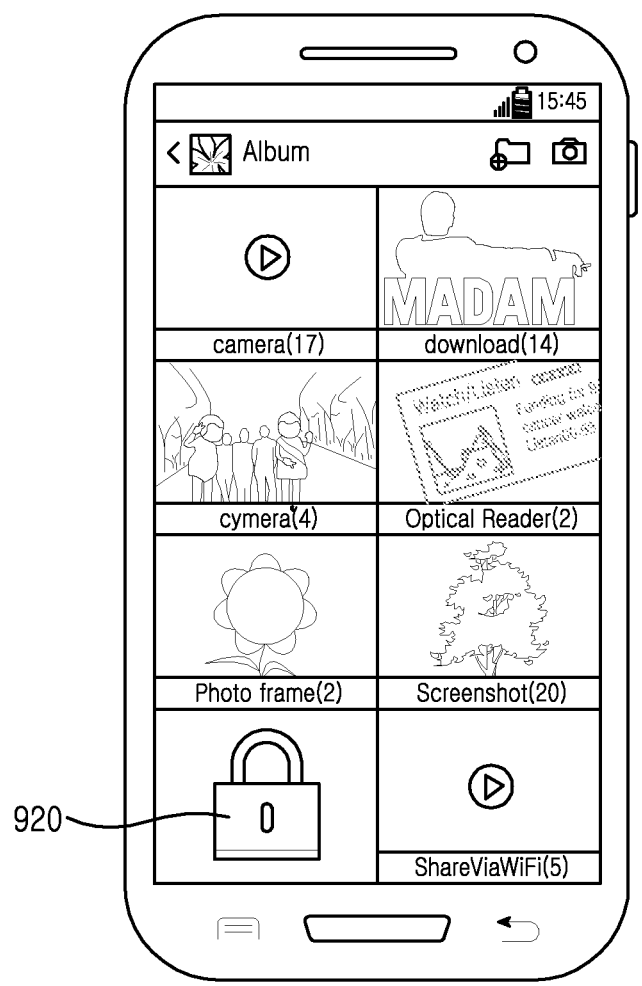

FIG. 4 illustrates a flowchart showing a procedure for providing a control function using a fingerprint sensor in an electronic device according to an embodiment of the present disclosure. FIGS. 7A and 7B illustrate views showing a configuration for setting a security function for an image using a fingerprint sensor in an electronic device according to an embodiment of the present disclosure. FIGS. 8A and 8B illustrate views showing a configuration for providing a payment service using a fingerprint sensor in an electronic device according to an embodiment of the present disclosure. FIGS. 9A, 9B, and 9C illustrate views showing a configuration for providing a control function for an image which is set using a fingerprint sensor in an electronic device according to an embodiment of the present disclosure. Hereinafter, the feature of providing a control function will be explained with reference to configurations illustrated in FIGS. 7A and 7B, FIGS. 8A and 8B, and FIG. 9A.

Referring to FIG. 4, the electronic device determines whether a photographing event occurs in operation 401. For example, the electronic device may display a preview image 700 or 800 which is acquired through the camera module 170 on the display 150 as shown in FIG. 7A and FIG. 8A. In this case, the electronic device 100 may determine whether a touch input on a photographing button 710 or 810 is detected based on input information detected through the inputter 140.

When the occurrence of the photographing event is not detected in operation 401, the electronic device may determine whether a photographing event occurs again in operation 401.

When the occurrence of the photographing event is detected in operation 401, the electronic device may acquire image data or moving image data using the camera module 170 in operation 403. For example, when a touch input 712 on the photographing button 710 is detected in FIG. 7A, the electronic device may capture the preview image 700 displayed on the display 150, thereby generating image data. For example, when a touch input 812 on the photographing button 810 is detected in FIG. 8A, the electronic device may capture the preview image 800 including a QR code 820, thereby generating image data.

The electronic device determines whether an effective time expires from the time of detecting the occurrence of the photographing event in operation 405. For example, when the occurrence of the photographing event is detected, the electronic device may determine whether the effective time expires by driving a timer which is driven during the effective time.

When the effective time does not expire from the time of detecting the occurrence of the photographing event in operation 405, the electronic device determines whether a touch input on the fingerprint sensor 160 is detected in operation 407.

When the touch input on the fingerprint sensor 160 is not detected in operation 407, the electronic device may determine whether the effective time expires from the time of detecting the occurrence of the photographing event in operation 405.

When the touch input on the fingerprint sensor 160 is detected in operation 407, the electronic device performs a control function for the image data or moving image data based on the touch input on the fingerprint sensor 160 in operation 409. For example, when a touch input 722 on a fingerprint sensor 720 is detected before the effective time expires as shown in FIG. 7B, the electronic device may transmit image data 900 acquired through the camera module 170 to a cloud server as shown in FIG. 9A. For example, when a touch input 832 on a fingerprint sensor 830 is detected before the effective time expires as shown in FIG. 8A, the electronic device may perform a payment function for a product corresponding to the QR code based on the touch input on the fingerprint sensor 160.

When the effective time expires from the time of detecting the occurrence of the photographing event in operation 405, the electronic device may store the image data or moving image data which is acquired through the camera module 170 in a default folder (for example, an album folder) in operation 411.

Figure 5:
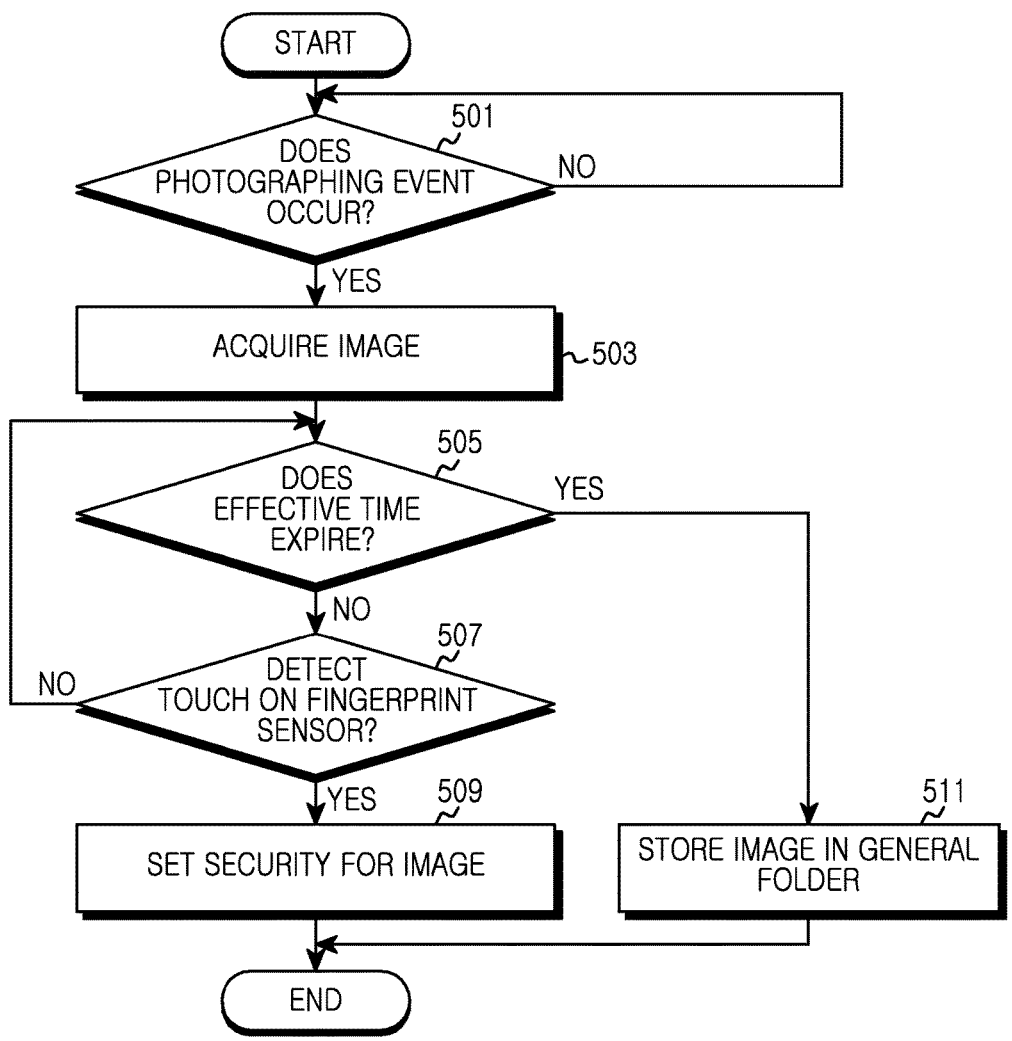
FIG. 5 illustrates a flowchart showing a procedure for setting a security function using a fingerprint sensor in an electronic device according to an embodiment of the present disclosure.

FIG. 5 illustrates a flowchart showing a procedure for setting a security function using a fingerprint sensor in an electronic device according to an embodiment of the present disclosure. Hereinafter, the feature of setting a security function will be explained with reference to configurations illustrated in FIGS. 9B and 9C.

Referring to FIG. 5, the electronic device determines whether a photographing event occurs in operation 501. For example, the electronic device may determine whether a photographing event occurs based on input information detected through the inputter 140.

When the occurrence of the photographing event is not detected in operation 501, the electronic device may determine whether a photographing event occurs again in operation 501.

When the occurrence of the photographing event is detected in operation 501, the electronic device may acquire image data using the camera module 170 in operation 503. For example, when the occurrence of the photographing event is detected, the electronic device may capture the preview image 700 displayed on the display 150, thereby generating image data.

The electronic device determines whether an effective time expires from the time of detecting the occurrence of the photographing event in operation 505. For example, when the occurrence of the photographing event is detected, the electronic device may determine whether the effective time expires by driving a timer which is driven during the effective time.

When the effective time does not expire from the time of detecting the occurrence of the photographing event in operation 505, the electronic device determines whether a touch input on the fingerprint sensor 160 is detected in operation 507.

When the touch input on the fingerprint sensor 160 is not detected in operation 507, the electronic device may determine whether the effective time expires from the time of detecting the occurrence of the photographing event in operation 505.

When the touch input on the fingerprint sensor 160 is detected in operation 507, the electronic device sets a security function for the image data based on the touch input on the fingerprint sensor 160 in operation 509. For example, when the touch input on the fingerprint sensor 160 is detected before the effective time expires, the electronic device may store the image data in a security folder 910 for which a password is set based on the touch input on the fingerprint sensor 160 as shown in FIG. 9B. In this case, the electronic device may set fingerprint information detected through the fingerprint sensor 160 as a password of the security folder 910. In another example, when the touch input on the fingerprint sensor 160 is detected before the effective time expires, the electronic device may set a password for the image data based on the touch input on the fingerprint sensor 160 and may store the image data in a default folder (for example, an album folder 920) as shown in FIG. 9C. In this case, the electronic device may set fingerprint information detected through the fingerprint sensor 160 as a password of the image data.

When the effective time expires from the time of detecting the occurrence of the photographing event in operation 505, the electronic device may store the image data acquired through the camera module 170 in the default folder (for example, an album folder) in operation 511.

In the above-described embodiment of the present disclosure, when the electronic device detects a touch input on the fingerprint sensor 160 before an effective time expires from the time of detecting occurrence of a photographing event, the electronic device may set a security function for image data which is acquired through the camera module 170.

According to another embodiment of the present disclosure, the electronic device may set a security function for moving image data which is acquired through the camera module 170 based on a touch input on the fingerprint sensor 160. For example, when occurrence of a photographing event is detected, the electronic device may generate moving image data by recording a moving image through the camera module 170 until occurrence of a photographing end event is detected. When the electronic device detects a touch input on the fingerprint sensor 160 before an effective time expires from the time of detecting the occurrence of the photographing end event, the electronic device may set a security function for the moving image data which is acquired through the camera module 170.

Figure 6:
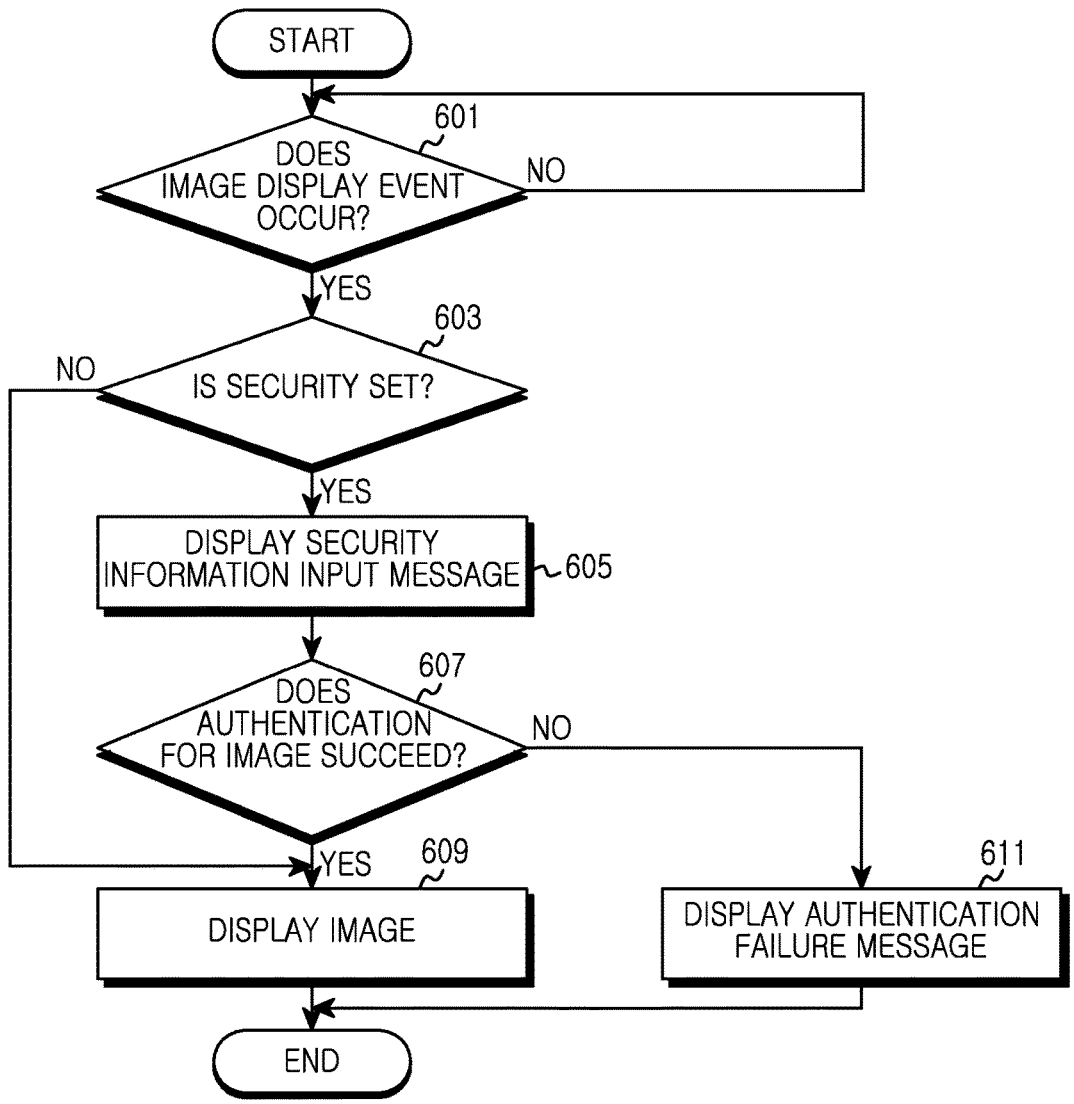
FIG. 6 illustrates a flowchart showing a procedure for displaying an image in an electronic device according to an embodiment of the present disclosure.

FIG. 6 illustrates a flowchart showing a procedure for displaying an image in an electronic device according to an embodiment of the present disclosure.

Referring to FIG. 6, the electronic device determines whether occurrence of an event for displaying an image is detected in operation 601. For example, the electronic device may determine whether an image to be displayed on the display 150 is selected based on input information detected through the inputter 140.

When the occurrence of the event for displaying the image is not detected in operation 601, the electronic device may continue determining whether the occurrence of the event for displaying the image is detected in operation 601.

When the occurrence of the event for displaying the image is detected in operation 601, the electronic device may determine whether a security function is set for the image corresponding to the occurrence of the event in operation 603.

When the security function is not set for the image corresponding to the occurrence of the event in operation 603, the electronic device displays the corresponding image on the display 150 in operation 609.

When the security function is set for the image corresponding to the occurrence of the event in operation 603, the electronic device may display a security information input message on the image on the display 150 in operation 605.

The electronic device determines whether authentication for the image succeeds by using input information which is detected through the inputter 140 or the fingerprint sensor 160 in response to the security information input message in operation 607. For example, the electronic device may determine whether the authentication for the corresponding image succeeds by comparing a password which is set for the image and input information which is detected through the inputter 140 or the fingerprint sensor 160 in response to the security information input message.

When the authentication for the image succeeds in operation 607, the electronic device may display the corresponding image on the display 150 in operation 609.

When the authentication for the image fails in operation 607, the electronic device may display an authentication failure message on the display 150 in operation 611.

Figure 10:
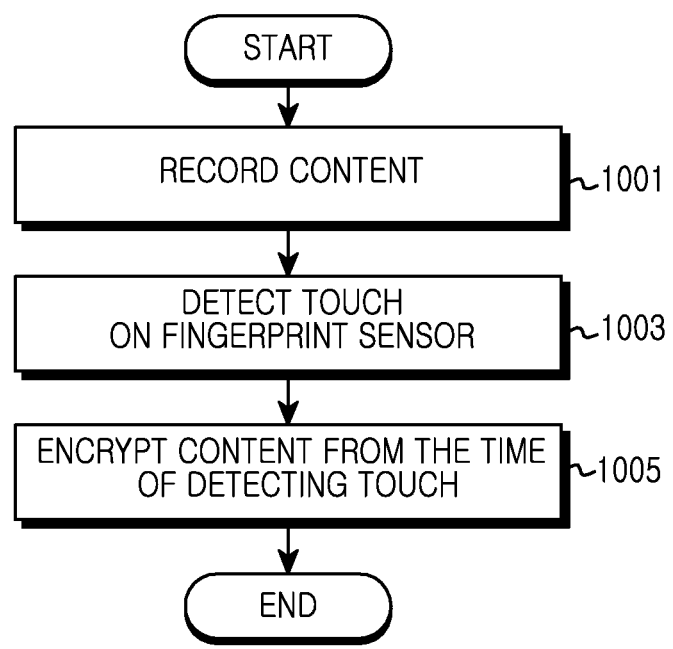
FIG. 10 illustrates a flowchart showing a procedure for setting a security function for at least some area of a content in an electronic device according to an embodiment of the present disclosure.

FIG. 10 illustrates a flowchart showing a procedure for setting a security function for at least some area of a content in an electronic device according to an embodiment of the present disclosure.

Referring to FIG. 10, the electronic device records a content in operation 1001. For example, the electronic device may determine whether a photographing event occurs based on input information which is detected through the inputter 140. When the occurrence of the photographing event is detected, the electronic device may record a moving image through the camera module 170. In another example, the electronic device may determine whether a sound recording event occurs based on input information which is detected through the inputter 140. When the occurrence of the sound recording event is detected, the electronic device may record an audio signal through a microphone.

The electronic device determines whether a touch input on the fingerprint sensor 160 is detected in operation 1003.

When the touch input on the fingerprint sensor 160 is detected while the content is being recorded, the electronic device may encrypt the content which is being recorded from the time of detecting the touch input on the fingerprint sensor 160 in operation 1005. In this case, the electronic device may set fingerprint information detected through the fingerprint sensor 160 as a password for at least some area of the content which is being encrypted.

Figure 11:
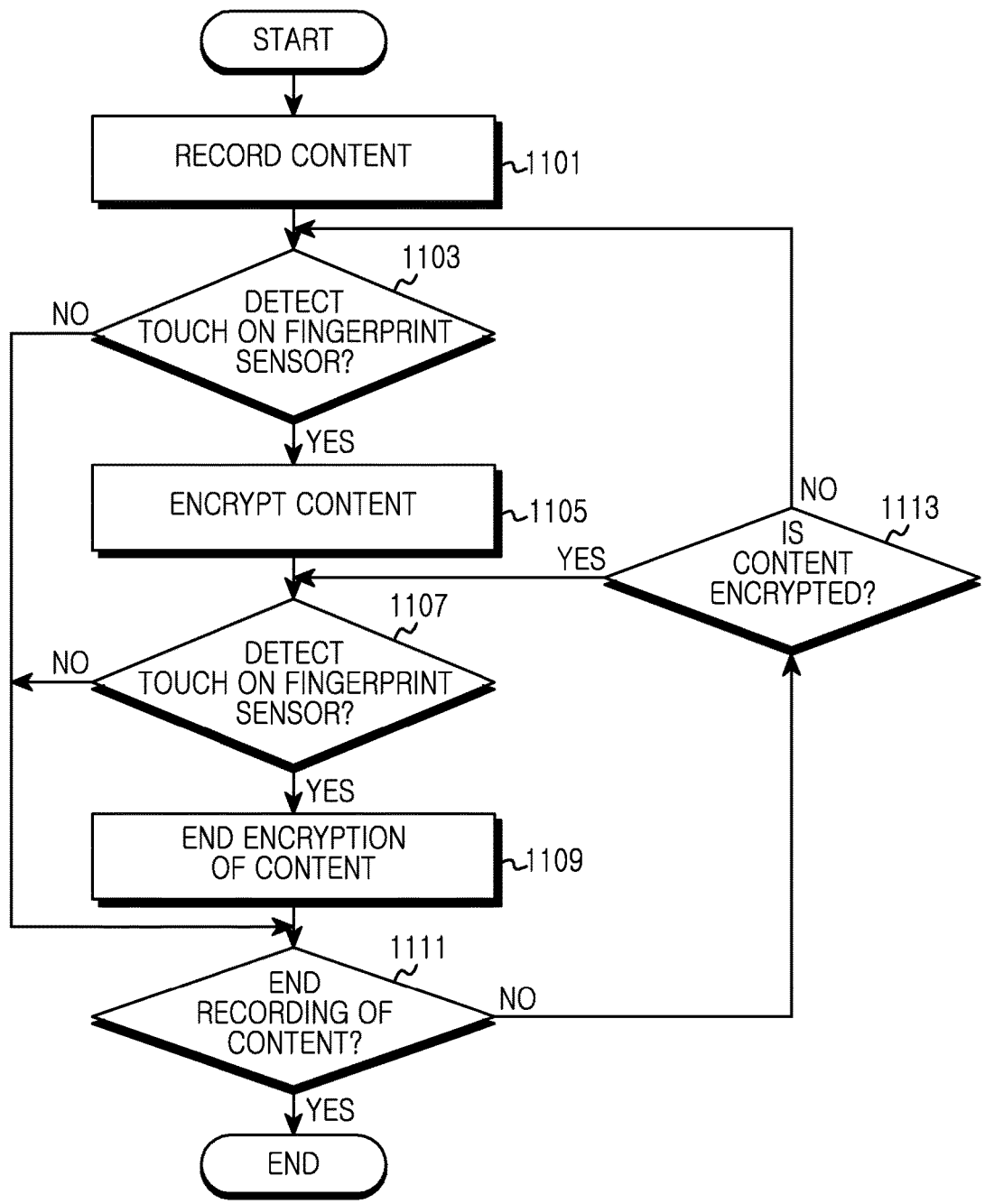
FIG. 11 illustrates a flowchart showing a procedure for setting a security function for at least some area of a content which is being recorded in an electronic device according to an embodiment of the present disclosure.
Figure 16A:
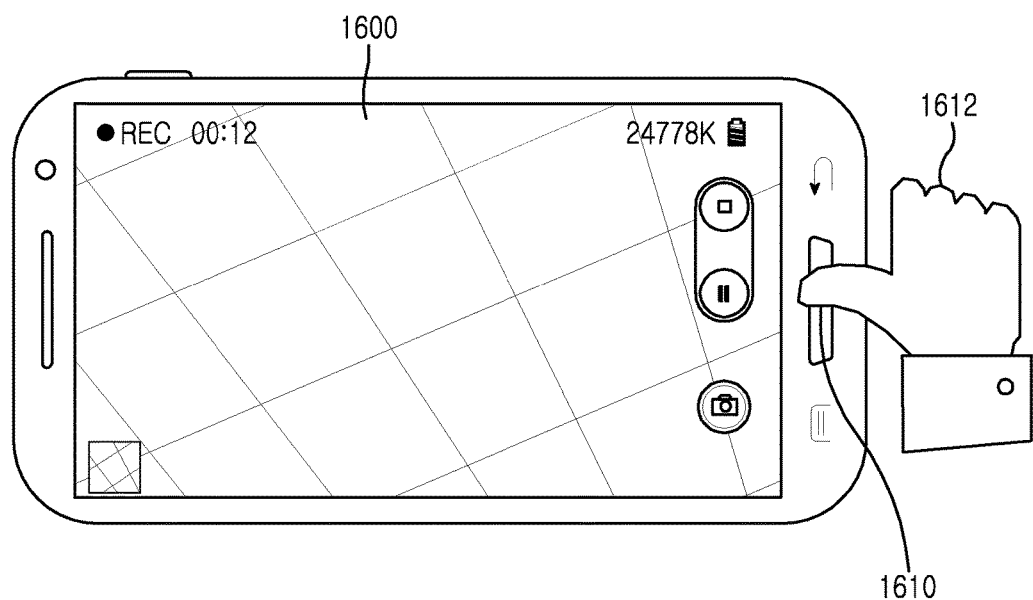
FIGS. 16A and 16B illustrate views showing a configuration for setting a security function for at least some area of a content in an electronic device according to an embodiment of the present disclosure.
Figure 16B:
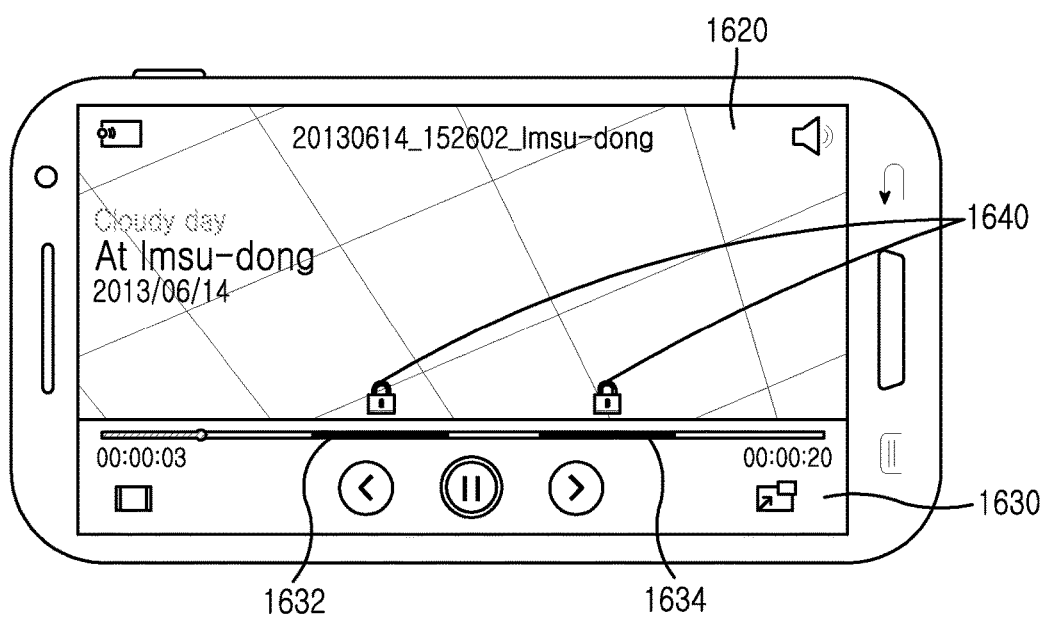

FIG. 11 illustrates a flowchart showing a procedure for setting a security function for at least some area of a content in an electronic device according to another embodiment of the present disclosure. FIGS. 16A and 16B illustrate views showing a configuration for setting a security function for at least some area of a content in an electronic device according to an embodiment of the present disclosure. Hereinafter, the feature of setting a security function for at least some area of a content will be explained with reference to a configuration shown in FIG. 16A.

Referring to FIG. 11, the electronic device records a content in operation 1101. For example, when occurrence of a photographing event is detected, the electronic device may start recording a moving image through the camera module 170. In another example, when a sound recording event occurs, the electronic device may start recording an audio signal through a microphone.

The electronic device determines whether a touch input on the fingerprint sensor 160 is detected in operation 1103. For example, the electronic device may determine whether a touch input 1612 on a fingerprint sensor 1610 is detected while a moving image 1600 is being recorded using the camera module 170 as shown in FIG. 16A.

When the touch input on the fingerprint sensor 160 is not detected in operation 1103, the electronic device determines whether the recording of the content ends in operation 1111. For example, the electronic device may determine whether a photographing end event occurs based on input information which is detected through the inputter 140. In another example, the electronic device may determine whether a sound recording end event occurs based on input information which is detected through the inputter 140.

When the touch input on the fingerprint sensor 160 is detected in operation 1103, the electronic device may encrypt the content which is being recorded from the time of detecting the touch input on the fingerprint sensor 160 in operation 1105. In this case, the electronic device may set fingerprint information detected through the fingerprint sensor 160 as a password for at least some area of the encrypted content.

The electronic device may determine whether a touch input on the fingerprint sensor 160 is detected in operation 1107.

When the touch input on the fingerprint sensor 160 is not detected in operation 1107, the electronic device determines whether the recording of the content ends in operation 1111.

When the touch input on the fingerprint sensor 160 is detected in operation 1107, the electronic device may end the encryption of the content which is being recorded in operation 1109.

The electronic device determines whether the recording of the content ends in operation 1111.

When the recording of the content does not end in operation 1111, the electronic device determines whether the content which is being recorded is encrypted in operation 1113.

When the content which is being recorded is not encrypted in operation 1113, the electronic device determines whether a touch input on the fingerprint sensor 160 is detected in operation 1103 to determine whether to encrypt the content which is being recorded.

When the content which is being recorded is encrypted in operation 1113, the electronic device determines whether a touch input on the fingerprint sensor 160 is detected in operation 1107 to determine whether to end the encryption of the content which is being recorded.

When the recording of the content ends in operation 1111, the electronic device may finish the present algorithm.

Figure 12:
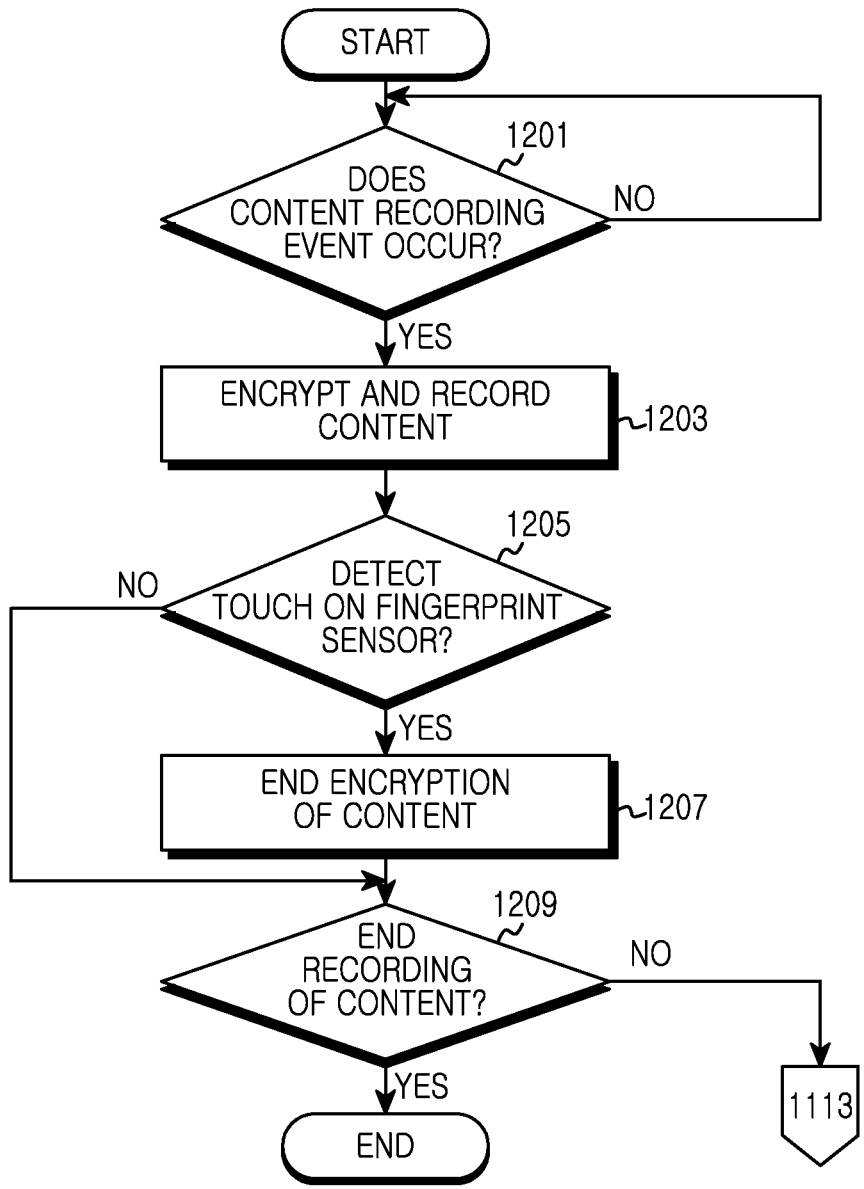
FIG. 12 illustrates a flowchart showing a procedure for setting a security function for at least some area of a content which is being recorded in an electronic device according to an embodiment of the present disclosure.

FIG. 12 illustrates a flowchart showing a procedure for setting a security function for at least some area of a content in an electronic device according to an embodiment of the present disclosure.

Referring to FIG. 12, the electronic device determines whether an event for recording a content occurs in operation 1201. For example, the electronic device may determine whether an event for photographing a moving image occurs based on input information detected through the inputter 140. In another example, the electronic device may determine whether an event for recording an audio signal occurs based on input information detected through the inputter 140.

When the occurrence of the event for recording the content is not detected in operation 1201, the electronic device may continue determining whether an event for recording a content occurs in operation 1201.

When the occurrence of the event for recording the content is detected in operation 1201, the electronic device records the content in operation 1203. In this case, the electronic device may encrypt the content which is being recorded from the time of recording. For example, when a content encryption menu is set, the electronic device may encrypt the content from the time of recording the content.

The electronic device determines whether a touch input on the fingerprint sensor 160 is detected in operation 1205.

When the touch input on the fingerprint sensor 160 is not detected in operation 1205, the electronic device may determine whether the recording of the content ends in operation 1209.

When the touch input on the fingerprint sensor 160 is detected in operation 1205, the electronic device ends the encryption of the content which is being recorded in operation 1207.

The electronic device determines whether the recording of the content ends in operation 1209.

When the recording of the content does not end in operation 1209, the electronic device may determine whether the content which is being recorded is encrypted in operation 1113 of FIG. 11.

When the recording of the content ends in operation 1209, the electronic device may finish the present algorithm.

Figure 13:
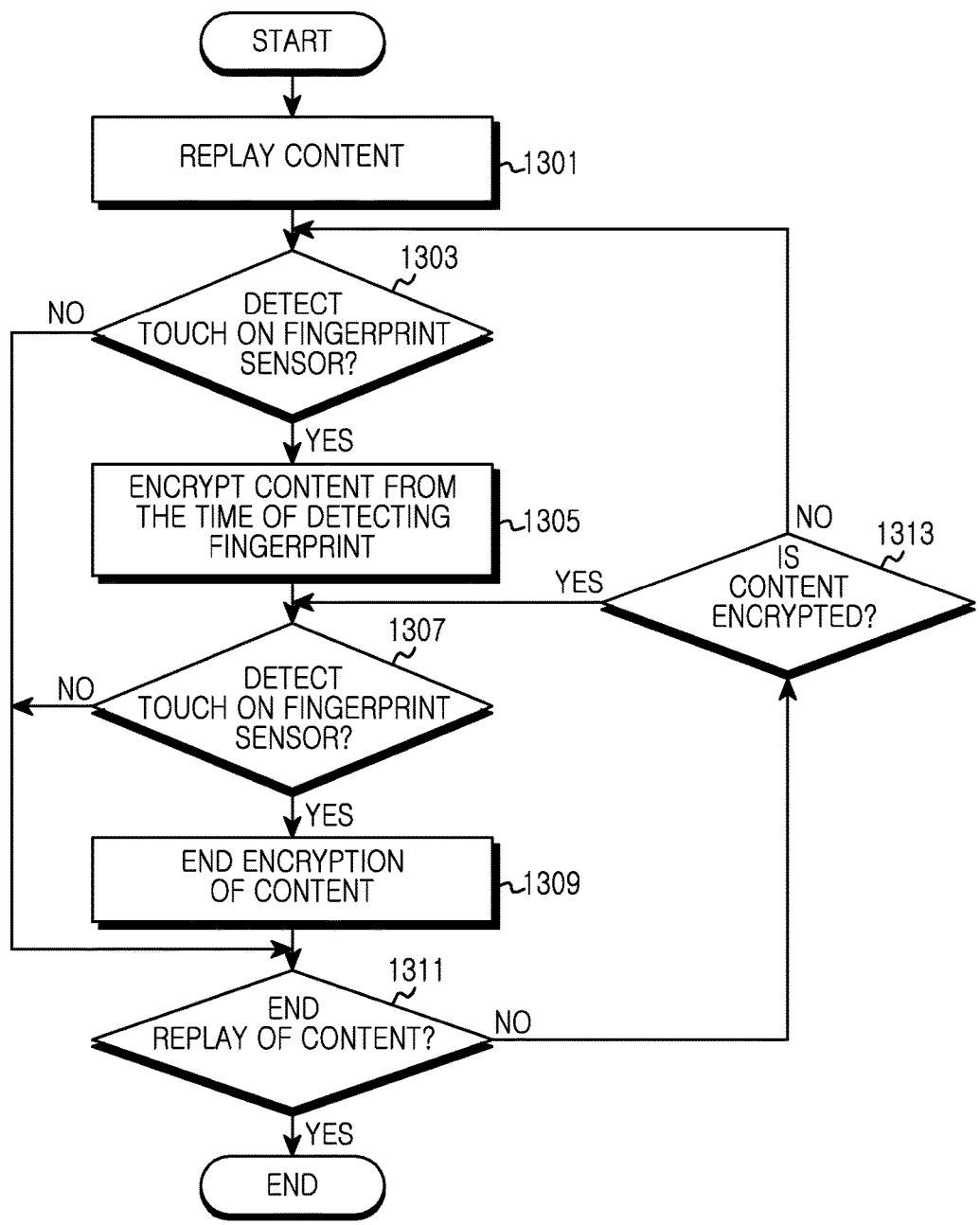
FIG. 13 illustrates a flowchart showing a procedure for setting a security function for at least some area of a content which is being replayed in an electronic device according to an embodiment of the present disclosure.

FIG. 13 illustrates a flowchart showing a procedure for setting a security function for at least some area of a content in an electronic device according to another embodiment of the present disclosure.

Referring to FIG. 13, the electronic device replays a content in operation 1301. For example, when one of the contents stored in the memory 130 is selected based on input information detected through the inputter 140, the electronic device may replay the corresponding content.

The electronic device determines whether a touch input on the fingerprint sensor 160 is detected in operation 1303.

When the touch input on the fingerprint sensor 160 is not detected in operation 1303, the electronic device determines whether the replay of the content ends in operation 1311. For example, the electronic device may determine whether a replay end event occurs based on input information detected through the inputter 140. In another example, the electronic device may determine whether a replay time of the content ends.

When the touch input on the fingerprint sensor 160 is detected in operation 1303, the electronic device may encrypt the content which is being replayed from the time of detecting the touch input on the fingerprint sensor 160 in operation 1305. In this case, the electronic device may set fingerprint information detected through the fingerprint sensor 160 as a password for at least some area of the encrypted content.

The electronic device may determine whether a touch input on the fingerprint sensor 160 is detected in operation 1307.

When the touch input on the fingerprint sensor 160 is not detected in operation 1307, the electronic device determines whether the replay of the content ends in operation 1311.

When the touch input on the fingerprint sensor 160 is detected in operation 1307, the electronic device may end the encryption of the content which is being replayed in operation 1309.

The electronic device determines whether the replay of the content ends in operation 1311.

When the replay of the content does not end in operation 1311, the electronic device determines whether the content which is being replayed is encrypted in operation 1313.

When the content which is being replayed is not encrypted in operation 1313, the electronic device determines whether a touch input on the fingerprint sensor 160 is detected in operation 1303 to determine whether to encrypt the content which is being replayed.

When the content which is being replayed is encrypted in operation 1313, the electronic device may determine whether a touch input on the fingerprint sensor 160 is detected in operation 1307 to determine whether to end the encryption of the content which is being replayed.

When the replay of the content ends in operation 1311, the electronic device may finish the present algorithm.

In the above-described embodiment, the electronic device may set a security function for at least some area of a content based on a touch input on the fingerprint sensor 160. When the security function is set for a plurality of areas of the content, the electronic device may set the same password or different passwords for the areas for which the security function is set.

According to another embodiment of the present disclosure, the electronic device may set a security function for at least some area of a content based on one or more of a security setting icon, a security setting button, and a security setting gesture.

Figure 14:
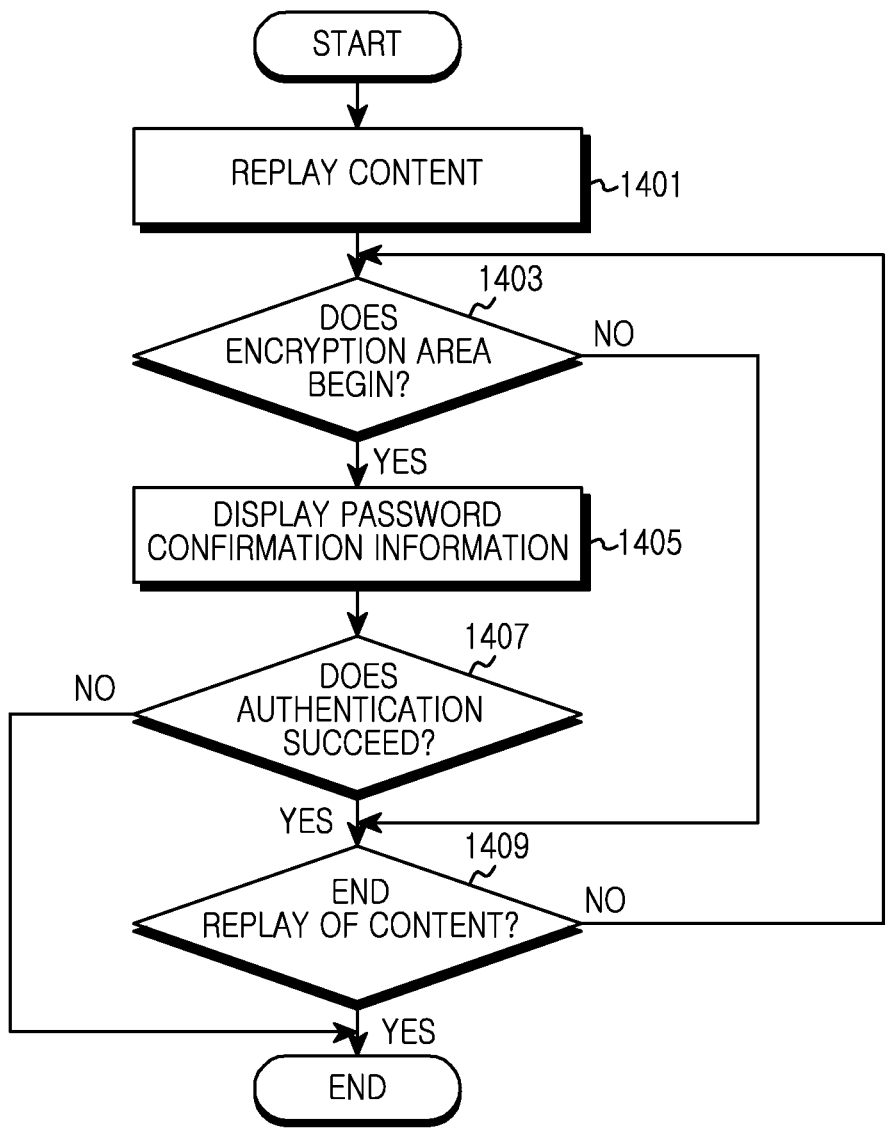
FIG. 14 illustrates a flowchart showing a procedure for replaying a content in an electronic device according to an embodiment of the present disclosure.

FIG. 14 illustrates a flowchart showing a procedure for replaying a content in an electronic device according to an embodiment of the present disclosure. Hereinafter, the feature of replaying a content will be explained with reference to a configuration shown in FIG. 16B.

Referring to FIG. 14, the electronic device replays a content in operation 1401. For example, when one of moving images stored in the memory 130 is selected based on input information detected through the inputter 140, the electronic device may display a replay screen 1620 of the selected moving image on the display 150 as shown in FIG. 16B. When at least some area of the moving image is encrypted, the electronic device may display the encrypted area 1632 or 1634 on a progress bar 1630 indicating a replay time of the moving image in different color as shown in FIG. 16B. Additionally, the electronic device may display a password icon 1640 on the encrypted area 1632 or 134.

The electronic device determines whether an encryption area begins in operation 1403.

When the encryption area does not begin in operation 1403, the electronic device determines whether the replay of the content ends in operation 1409. For example, the electronic device may determine whether a replay end event occurs based on input information detected through the inputter 140. In another example, the electronic device may determine whether a replay time of the content ends.

When the encryption area begins in operation 1403, the electronic device may display a security information input message on the encryption area on the display 150 in operation 1405.

The electronic device determines whether authentication for the encryption area succeeds by using input information which is detected through the inputter 140 or the fingerprint sensor 160 in response to the security information input message in operation 1407. For example, the electronic device may determine whether the authentication for the encryption area succeeds by comparing a password which is set for the encryption area and input information which is detected through the inputter 140 or the fingerprint sensor 160 in response to the security information input message.

When the authentication for the encryption area fails in operation 1407, the electronic device may finish the present algorithm. For example, the electronic device may stop replaying the content and may display an authentication failure message on the display 150.

When the authentication for the encryption area succeeds in operation 1407, the electronic device determines whether the replay of the content ends in operation 1409.

When the replay of the content does not end in operation 1409, the electronic device may determine whether an encryption area begins in operation 1403.

When the replay of the content ends in operation 1409, the electronic device may finish the present algorithm.

Figure 15:
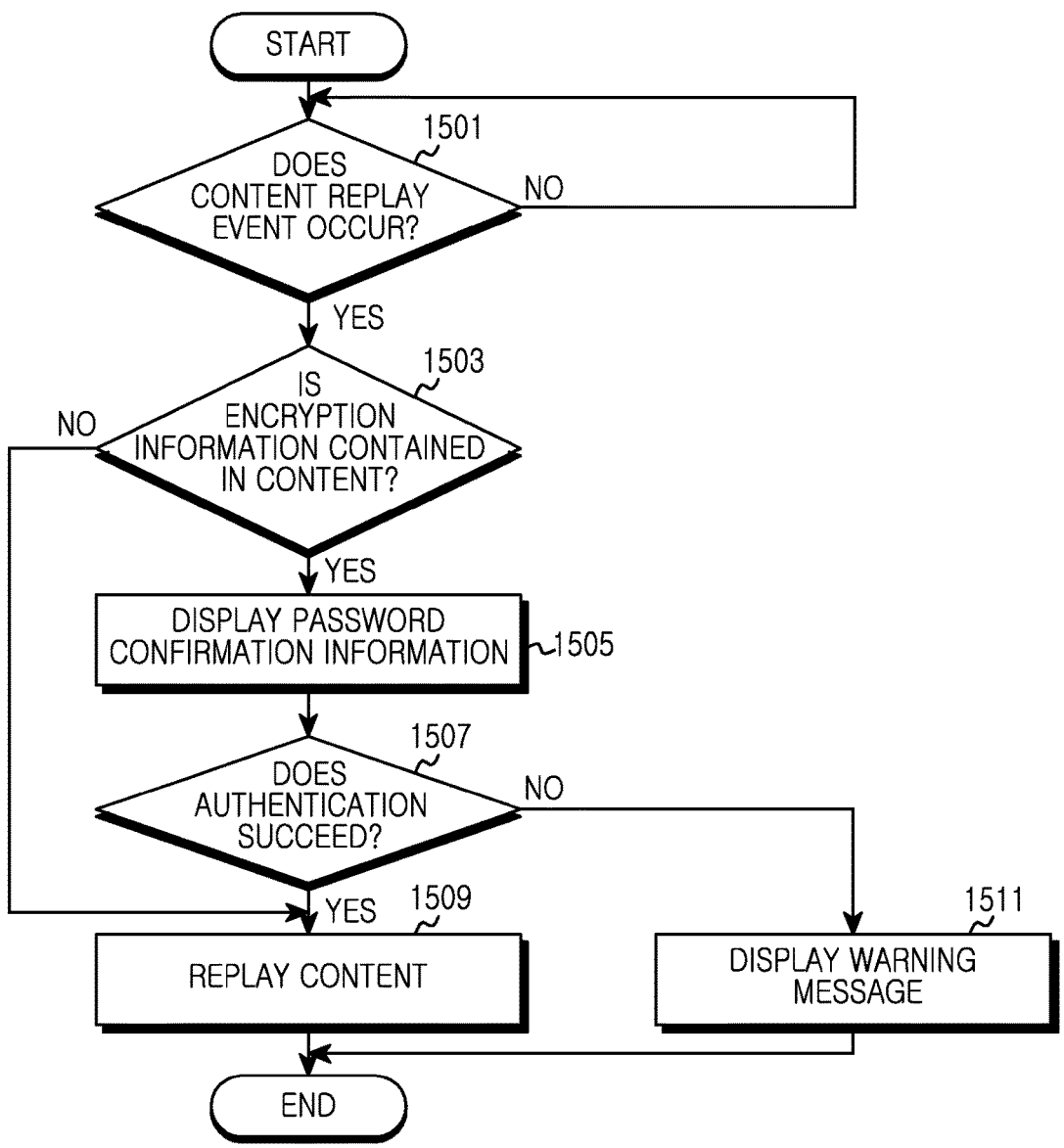
FIG. 15 illustrates a flowchart showing a procedure for replaying a content in an electronic device according to an embodiment of the present disclosure.

FIG. 15 illustrates a flowchart showing a procedure for replaying a content in an electronic device according to an embodiment of the present disclosure.

Referring to FIG. 15, the electronic device determines whether an event for replaying a content occurs in operation 1501. For example, the electronic device may determine whether selection of a moving image file for replaying is detected based on input information which is detected through the inputter 140. In another example, the electronic device may determine when selection of an audio file for replaying is detected based on input information which is detected through the inputter 140.

When the event for replaying the content does not occur in operation 1501, the electronic device may continue determining whether an event for replaying a content occurs in operation 1501.

When the event for replaying the content occurs in operation 1501, the electronic device determines whether the content corresponding to the occurrence of the event for replaying the content contains encryption information in operation 1503. For example, the electronic device may determine whether at least some area of the content selected by the event for replaying the content is encrypted.

When the content does not contain the encryption information in operation 1503, the electronic device replays the content in operation 1509.

When the content contains the encryption information in operation 1503, the electronic device may display a security information input message on an encrypted area on the display 150 in operation 1505.

The electronic device determines whether authentication for the content succeeds by using input information which is detected through the inputter 140 or the fingerprint sensor 160 in response to the security information input message in operation 1507. For example, the electronic device may determine whether the authentication for the content succeeds by comparing a password which is set for the content and input information which is detected through the inputter 140 or the fingerprint sensor 160 in response to the security information input message.

When the authentication for the content fails in operation 1507, the electronic device may display an authentication failure message on the display 150 in operation 1511.

When the authentication for the content succeeds in operation 1507, the electronic device may replay the content in operation 1509.

In the above-described embodiment, the electronic device may authenticate a password of a content prior to replaying the content. When the content includes a plurality of encrypted areas including different passwords, the electronic device may perform an authentication procedure for each of the encrypted areas.

Figure 17:
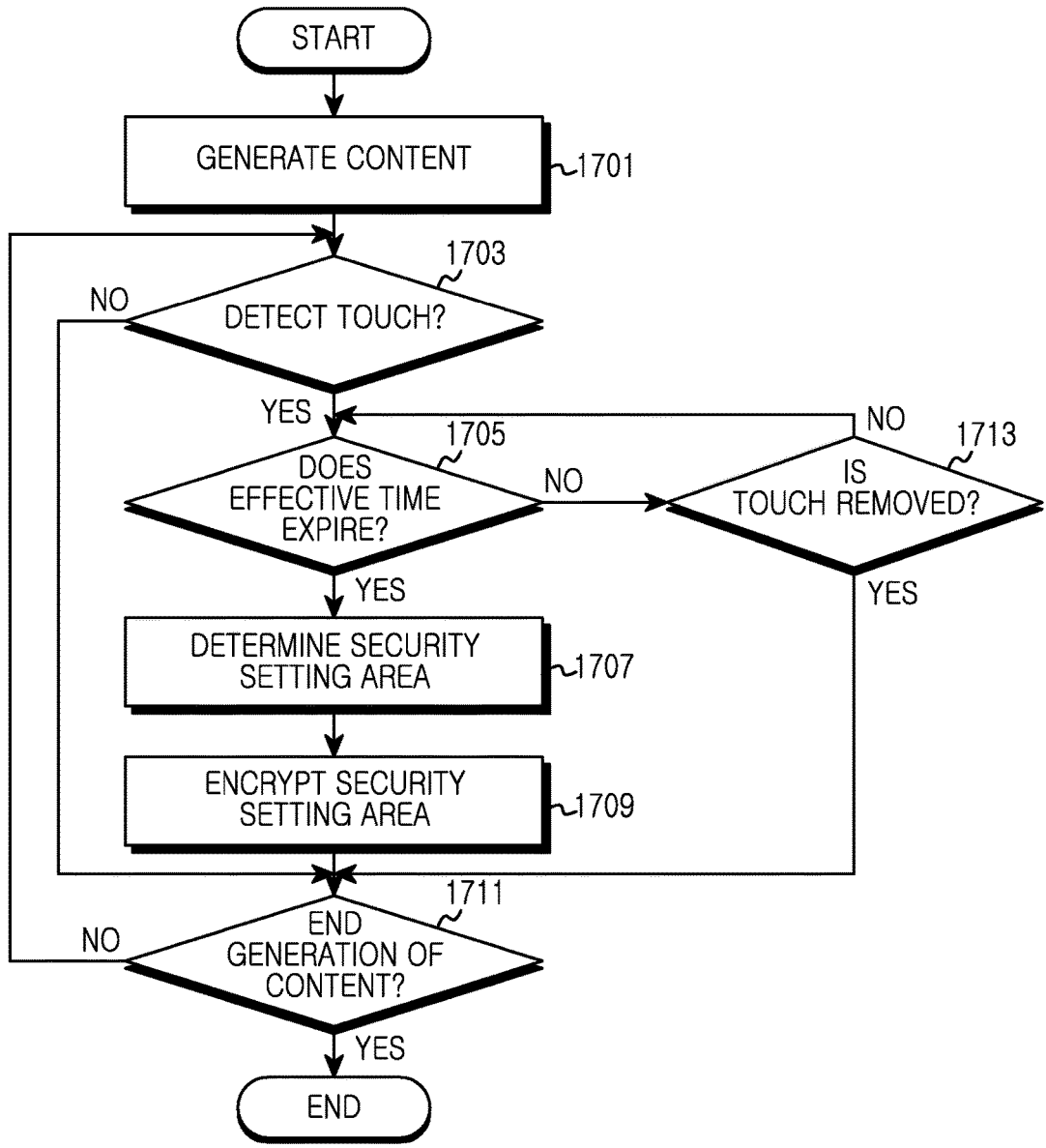
FIG. 17 illustrates a flowchart showing a procedure for setting a security function for at least some area of a content which is generated in an electronic device according to an embodiment of the present disclosure.
Figure 21A:
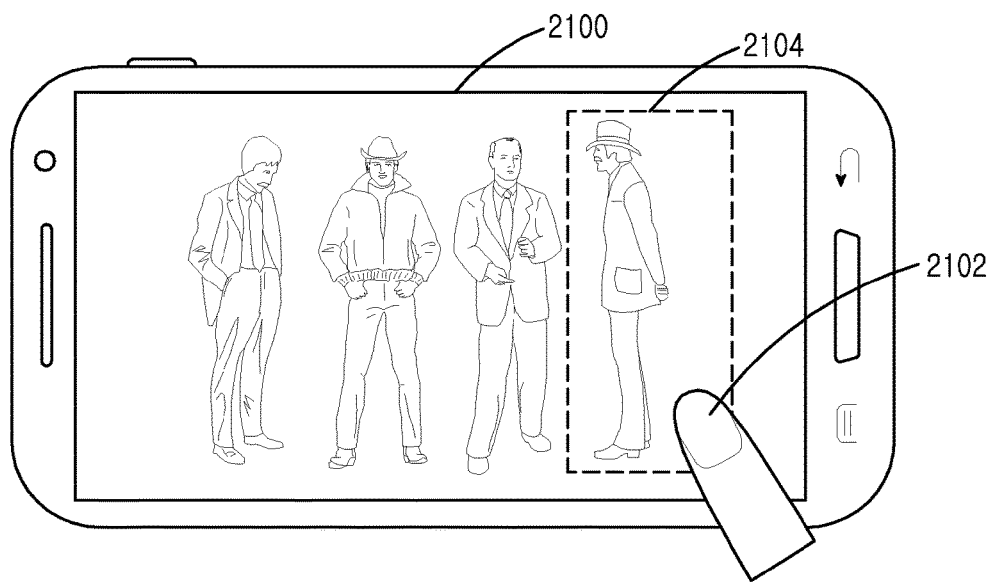
FIGS. 21A, 21B, and 21C illustrate views showing a configuration for setting a security function for at least some area of a content in an electronic device according to an embodiment of the present disclosure.
Figure 21B:
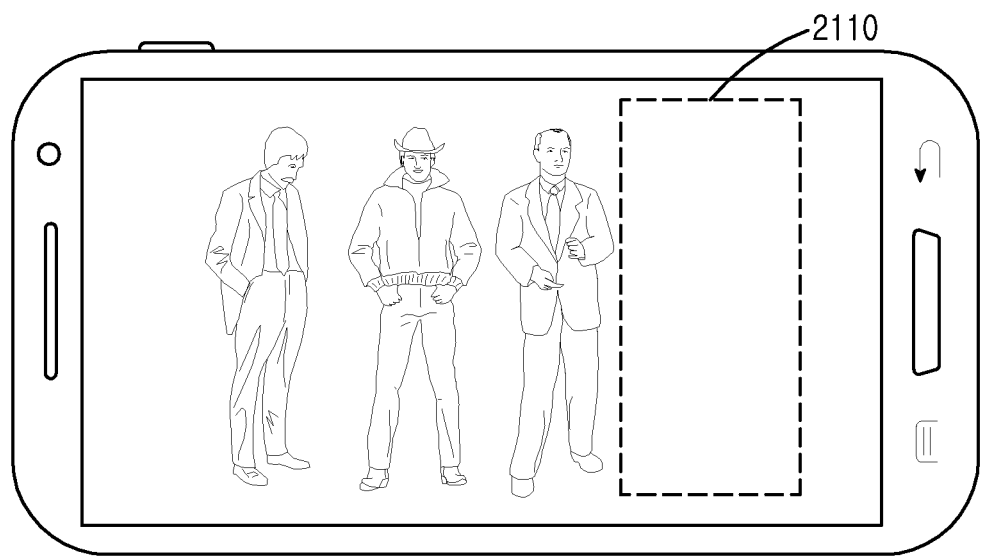
Figure 21C:
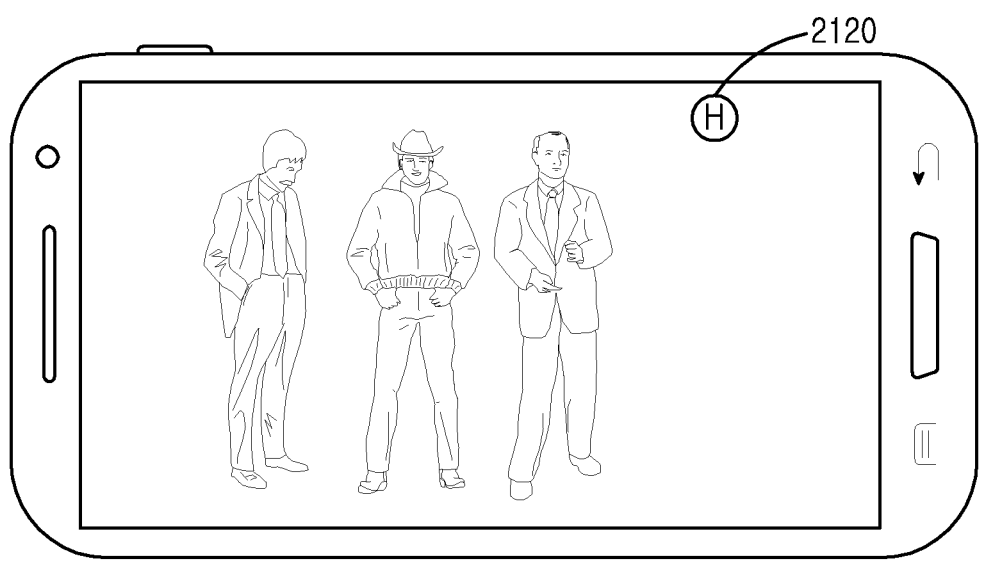

FIG. 17 illustrates a flowchart showing a procedure for setting a security function for at least some area of a content which is generated in an electronic device according to an embodiment of the present disclosure. FIGS. 21A, 21B, and 21C illustrate views showing a configuration for setting a security function for at least some area of a content in an electronic device according to an embodiment of the present disclosure. Hereinafter, the feature of setting a security function for at least some area of a content will be explained with reference to a screen configuration shown in FIG. 21A.

Referring to FIG. 17, the electronic device generates a content in operation 1701. For example, when occurrence of a photographing event is detected, the electronic device may take a photograph through the camera module 170. In another example, the electronic device may generate a text-based content based on user input information which is provided through the inputter 140. The text-based content may include an electronic book (e-book) content.

The electronic device determines whether a touch input on the content is detected in operation 1703. For example, referring to FIG. 21A, the electronic device may determine whether a touch input 2102 is detected through the inputter 140 while an image 2100 is being photographed by the camera module 170. In another example, when the fingerprint sensor 160 is included in the entirety of the display 150, the electronic device may determine whether the touch input 2102 by a user's finger is detected through the fingerprint sensor 160 while photographing the image 2100 using the camera module 170.

When the touch input on the content is not detected in operation 1703, the electronic device determines whether the generation of the content ends in operation 1711. For example, the electronic device may determine whether a photographing end event occurs based on input information which is detected through the inputter 140.

When the touch input on the content is detected in operation 1703, the electronic device may determine whether an effective time expires from the time of detecting the touch input on the content in operation 1705.

When the effective time does not expire from the time of detecting the touch input on the content in operation 1705, the electronic device may determine whether the touch on the content is removed in operation 1713.

When the touch on the content is removed in operation 1713, the electronic device may determine whether the generation of the content ends in operation 1711.

When the touch on the content is not removed in operation 1713, the electronic device may determine whether the effective time expires from the time of detecting the touch input on the content in operation 1705.

When the effective time expires from the time of detecting the touch input on the content in operation 1705, the electronic device may determine a security setting area based on a touch point in operation 1707. For example, the electronic device may determine an area 2104 of a certain size formed with reference to a touch point as a security setting area as shown in FIG. 21A. In another example, the electronic device may determine at least one image included in the touch point as a security setting area. In another example, the electronic device may determine a view where the touch is detected as a security setting area. The view may include one or more of a text view, a web view, an image view, a custom view, and the like.

The electronic device may encrypt at least part of the content that is included in the security setting area in operation 1709. In this case, the electronic device may set fingerprint information detected through the fingerprint sensor 160 as a password for the security setting area. For example, when the fingerprint sensor 160 is included in the entirety of the display 150, the electronic device may set fingerprint information identified through the touch input which is detected in operation 1703 as a password for the security setting area. In another example, the electronic device may display a fingerprint input message on the display 150 when encrypting the security setting area. The electronic device may set a fingerprint detected through the fingerprint sensor 160 according to the fingerprint input message as a password for the security setting area.

The electronic device determines whether the generation of the content ends in operation 1711.

When the generation of the content does not end in operation 1711, the electronic device may determine whether a touch input on the content is detected in operation 1703.

When the generation of the content ends in operation 1711, the electronic device may finish the present algorithm. When at least some area of the content is encrypted, the electronic device may store the content and encryption information on the content. For example, the electronic device may generate and store a non-encrypted content and a content at least some area of which is encrypted. In another example, the electronic device may generate and store a non-encrypted content and password setting information for at least some area of a corresponding content that is encrypted. The password setting information may include a location where a password is set and a password of a corresponding location.

Figure 18:
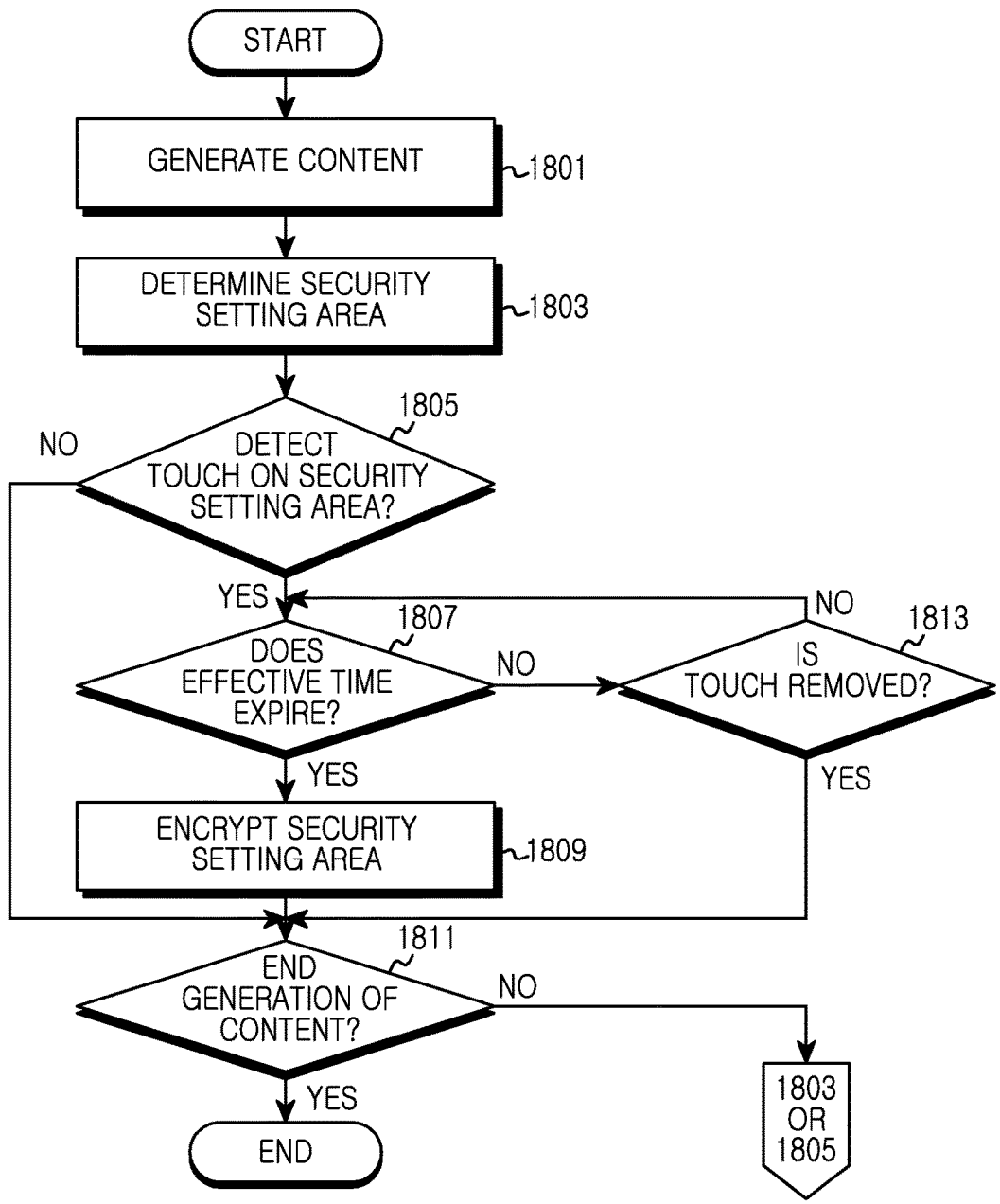
FIG. 18 illustrates a flowchart showing a procedure for setting a security function for at least some area of a content which is generated in an electronic device according to an embodiment of the present disclosure.

FIG. 18 illustrates a flowchart showing a procedure for setting a security function for at least some area of a content which is generated in an electronic device according to an embodiment of the present disclosure.

Referring to FIG. 18, the electronic device generates a content in operation 1801.

The electronic device may determine a security setting area including at least some area of the content in operation 1803. For example, the electronic device may determine a security setting area based on touch information which is provided through the inputter 140. In another example, when the fingerprint sensor 160 is included in the entirety of the display 150, the electronic device may determine a security setting area based on touch information which is provided through at least one of the inputter 140 and the fingerprint sensor 160.

The electronic device determines whether a touch input on the security setting area is detected in operation 1805.

When the touch input on the security setting area is not detected in operation 1805, the electronic device determines whether the generation of the content ends in operation 1811.

When the generation of the content does not end in operation 1811, the electronic device may determine whether a touch input on the security setting area is detected in operation 1805.

When the touch input on the security setting area is detected in operation 1805, the electronic device may determine whether an effective time expires from the time of detecting the touch input on the security setting area in operation 1807.

When the effective times does not expire from the time of detecting the touch input on the security setting area in operation 1807, the electronic device may determine whether the touch on the security setting area is removed in operation 1813.

When the touch on the security setting area is removed in operation 1813, the electronic device may determine whether the generation of the content ends in operation 1811.

When the generation of the content does not end in operation 1811, the electronic device may determine a security setting area in operation 1803.

When the touch on the security setting area is not removed in operation 1813, the electronic device may determine whether the effective time expires from the time of detecting the touch input on the security setting area in operation 1807.

When the effective time expires from the time of detecting the touch input on the security setting area in operation 1807, the electronic device may encrypt at least part of the content that is included in the security setting area in operation 1809. In this case, the electronic device may set fingerprint information detected through the fingerprint sensor 160 as a password for the security setting area. For example, when the fingerprint sensor 160 is included in the entirety of the display 150, the electronic device may set fingerprint information identified through the touch input which is detected in operation 1805 as a password for the security setting area. In another example, the electronic device may display a fingerprint input message on the display 150 when encrypting the security setting area. The electronic device may set a fingerprint which is detected through the fingerprint sensor 160 according to the fingerprint input message as a password for the security setting area.

The electronic device determines whether the generation of the content ends in operation 1811.

When the generation of the content does not end in operation 1811, the electronic device may determine a security setting area in operation 1803.

When the generation of the content ends in operation 1811, the electronic device may finish the present algorithm. When at least some area of the content is encrypted, the electronic device may store the content and encryption information on the content. For example, the electronic device may generate and store a non-encrypted content and a content at least some area of which is encrypted. In another example, the electronic device may generate and store a non-encrypted content and password setting information on at least some area of a corresponding content that is encrypted. The password setting information may include a location where a password is set and a password of a corresponding location.

Figure 19:
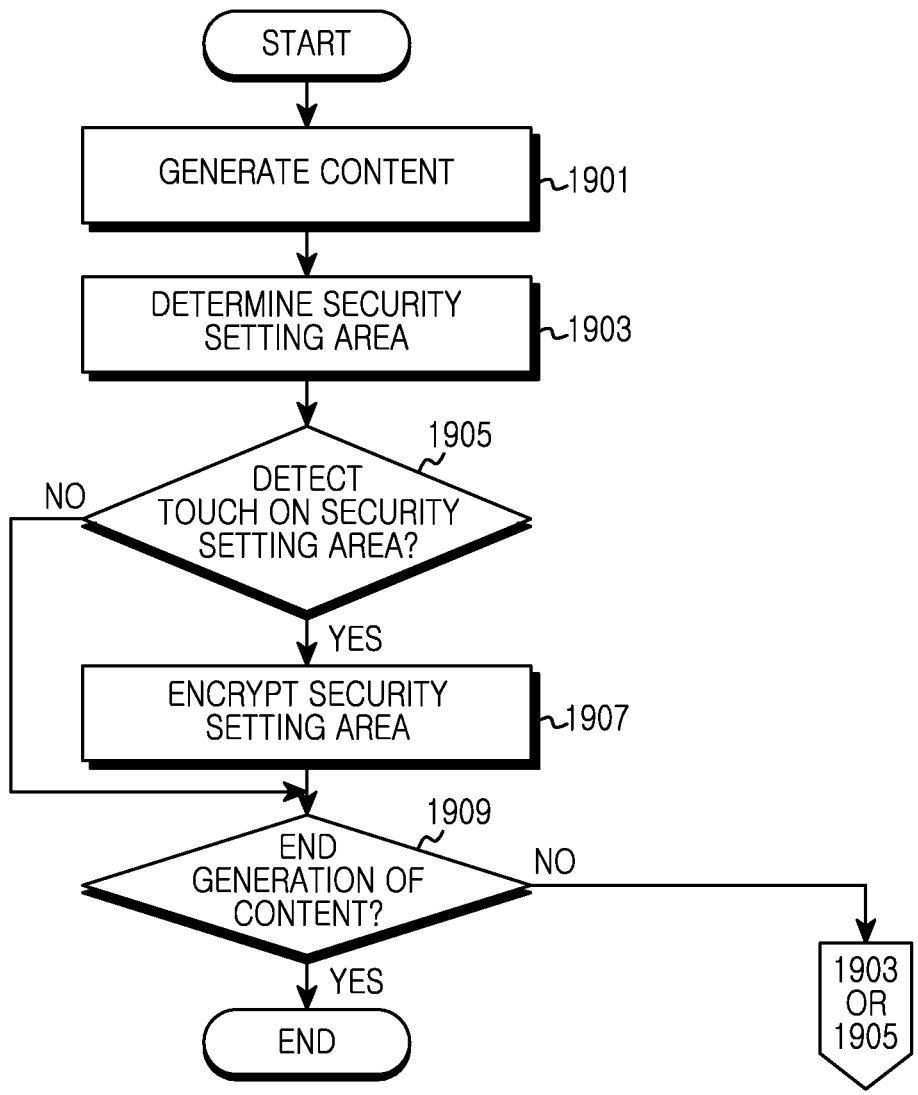
FIG. 19 illustrates a flowchart showing a procedure for setting a security function for at least some area of a content which is generated in an electronic device according to an embodiment of the present disclosure.

FIG. 19 illustrates a flowchart showing a procedure for setting a security function for at least some area of a content which is generated in an electronic device according to an embodiment of the present disclosure.

Referring to FIG. 19, the electronic device generates a content in operation 1901.

The electronic device may determine a security setting area including at least some area of the content in operation 1903. For example, the electronic device may determine a security setting area based on touch information which is provided through the inputter 140.

The electronic device determines whether a touch input is detected through the fingerprint sensor 160 in operation 1905.

When the touch input is not detected through the fingerprint sensor 160 in operation 1905, the electronic device determines whether the generation of the content ends in operation 1909.

When the generation of the content does not end in operation 1909, the electronic device may determine whether a touch input is detected through the fingerprint sensor 160 in operation 1905.

When the touch input is detected through the fingerprint sensor 160 in operation 1905, the electronic device may encrypt at least some part of the content that is included in the security setting area in operation 1907. In this case, the electronic device may set fingerprint information which is detected through the fingerprint sensor 160 as a password for the security setting area. For example, the electronic device may set a fingerprint which is detected through the fingerprint sensor 160 in operation 1905 as a password for the security setting area.

The electronic device determines whether the generation of the content ends in operation 1909.

When the generation of the content does not end in operation 1909, the electronic device may determine a security setting area in operation 1903.

When the generation of the content ends in operation 1909, the electronic device may finish the present algorithm. When at least some area of the content is encrypted, the electronic device may store the content and encryption information on the content. For example, the electronic device may generate and store a non-encrypted content and a content at least some area of which is encrypted. In another example, the electronic device may generate and store a non-encrypted content and password setting information on at least some area of a corresponding content that is encrypted.

Figure 20:
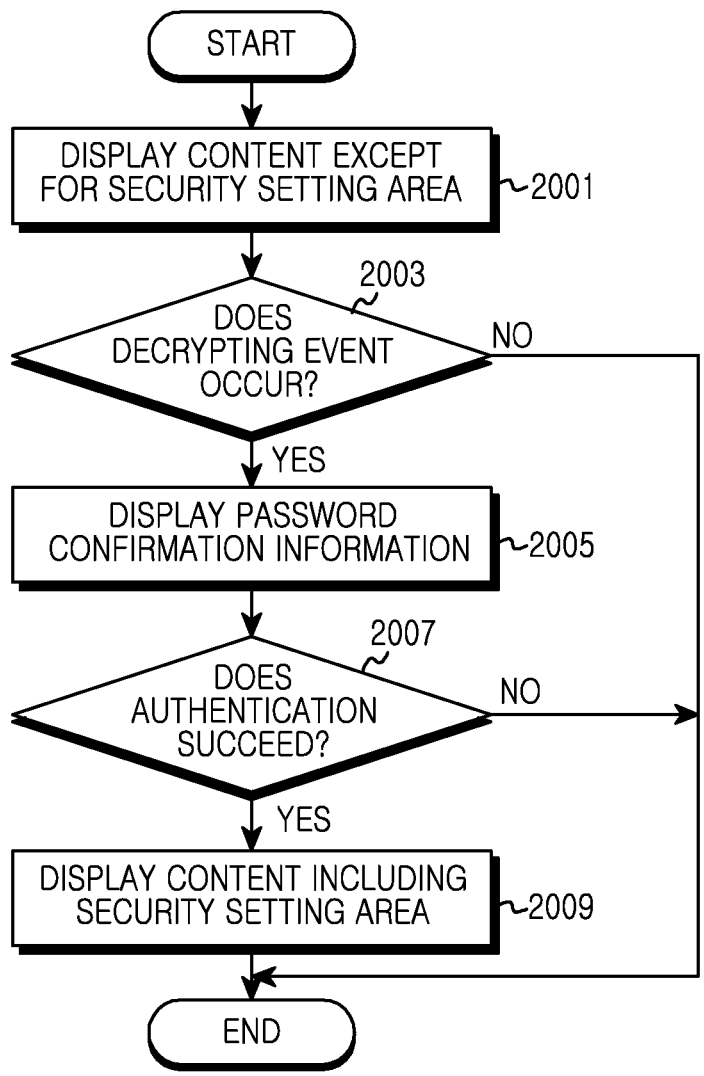
FIG. 20 illustrates a flowchart showing a procedure for determining at least some area of a content that is encrypted in an electronic device according to an embodiment of the present disclosure.

FIG. 20 illustrates a flowchart showing a procedure for determining at least some area of a content that is encrypted in an electronic device according to an embodiment of the present disclosure. Hereinafter, the feature of displaying a content will be explained with reference to a screen configuration shown in FIGS. 21B and 21C.

Referring to FIG. 20, the electronic device may display at least some area of a content except for a security setting area on the display 150 in operation 2001. For example, when a content to be displayed on the display 150 is selected based on input information which is detected through the inputter 140, the electronic device may determine whether the corresponding content includes a security setting area. When the corresponding content includes a security setting area, the electronic device may display at least some area of the content except for the security setting area on the display 150 as shown in FIGS. 21B and 21C. In this case, the electronic device may display security setting area information on the display 150. For example, the electronic device may display an outline 2110 on the security setting area on the display 150 as shown in FIG. 21B. In another example, the electronic device may display an icon 2120 indicating the existence of the security setting area on the display 150.

The electronic device may determine whether a decrypting event on the security setting area occurs in operation 2003. For example, the electronic device may determine whether a touch input on the security setting area is detected. In another example, the electronic device may determine whether a touch input on the fingerprint sensor 160 is detected.

When the decrypting event does not occur in operation 2003, the electronic device may finish the present algorithm.

When the decrypting event occurs in operation 2003, the electronic device may display a security information input message on one or more security setting areas where the decrypting event occurs on the display 150 in operation 2005.

The electronic device determines whether authentication for the security setting area succeeds by using input information which is detected through the inputter 140 or the fingerprint sensor 160 in response to the security information input message in operation 2007. For example, the electronic device may determine whether the authentication for the security setting area succeeds by comparing a password which is set for the security setting area and input information which is detected through the inputter 140 or the fingerprint sensor 160 in response to the security information input message.

When the authentication for the security setting area fails in operation 2007, the electronic device may finish the present algorithm. For example, the electronic device may display an authentication failure message on the display 150.

When the authentication for the security setting area succeeds in operation 2007, the electronic device may display data of at least some area of the content that is included in the security setting area on the display 150 in operation 2009. For example, when the electronic device generates and stores a non-encrypted first content and a second content which is a result of the encryption of at least some area of the first content as a security setting area, the electronic device may replace the second content displayed on the display 150 with the first content and display the first content based on success in authentication for the security setting area.

According to various embodiments of the present disclosure, the electronic device provides a control function based on touch information of the fingerprint sensor, so that availability of the fingerprint sensor and user's convenience for performing the control function can be improved.

According to various embodiments of the present disclosure, the electronic device sets a security function for at least some area of a content using the fingerprint sensor, so that user's convenience for setting security for a content can be improved.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), a Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus of an electronic device, the apparatus comprising:
a memory configured to store instructions;
a camera module;
a display;

a fingerprint sensor; and
a processor configured to execute the stored instructions to:
receive a first input for capturing an image,
in response to receiving the first input for capturing the image, capture an image from the camera module, and display the captured image on the display,
identify whether a second input on the fingerprint sensor is detected for a predetermined period from time at which the first input is received,
if the second input on the fingerprint sensor is detected within the predetermined period, store image data of the captured image in a security folder of the memory, the security folder being encrypted based on fingerprint information obtained from the second input, and
if the predetermined period is expired from the time at which the first input is received, store the image data of the captured image in a general folder of the memory.

2. The apparatus of claim 1, wherein the first input for capturing the image comprises a touch input on a capture icon displayed on the display.

3. The apparatus of claim 1, wherein the processor is further configured to execute the stored instructions to if it is determined that the fingerprint information obtained from the second input is invalid, store the image data of the captured image in the general folder of the memory.

4. The apparatus of claim 1,
wherein the processor is further configured to execute the stored instructions to, when the captured image comprises a quick response (QR) code, and if the second input on the fingerprint sensor is detected within the predetermined period perform a payment function for a product corresponding to the QR code.

5. An apparatus for operating an electronic device, the apparatus comprising: a memory configured to store instructions;
a camera module;
a display;
a fingerprint sensor included in the display; and
a processor configured to execute the stored instructions:
display, on the display, an image,
detect a touch input at a position of the displayed image on the display,
receive fingerprint information from the touch input on the fingerprint sensor superimposed on the position of the display, and
if the fingerprint information is valid and the touch input is maintained on a predetermined time, display a specific area of the image, having a predetermined size based on the position as an encryption area, the encryption area being restricted from being displayed while the image is displayed except for the encryption area.

6. The apparatus of claim 5, wherein the image comprises a moving image content, an image content, or a text-based content.

7. The apparatus of claim 5, wherein the processor is further configured to execute the instructions to:
store the image with encryption.

8. The apparatus of claim 5, wherein the processor is further configured to execute the stored instructions to:
display an outline of the encryption area with the image.

9. The apparatus of claim 5, wherein the processor is further configured to:
display an icon for indicating that the image comprises the encryption area with the image.

10. A method for operating an electronic device, the method comprising:
receiving a first input for capturing an image;
in response to receiving the first input for capturing the image, capturing an image from a camera module of the electronic device and displaying the captured image on a display of the electronic device;
identifying whether a second input on the fingerprint sensor is detected for a predetermined period from time at which the first input is received;
if the second input on the fingerprint sensor is detected within the predetermined period, storing image data of the captured image in a security folder of the memory, the security folder being encrypted based on fingerprint information obtained from the second input; and
if the predetermined period is expired from the time at which the first input is received, storing the image data of the captured image in a general folder of the memory.

11. The method of claim 10, wherein the first input for capturing the image comprises a touch input on a capture icon displayed on the display.

12. The method of claim 10, further comprising;
if it is determined that the fingerprint information obtained from the second input is invalid, storing the image data of the captured image in the general folder of the memory.

13. The method of claim 10, further comprising:
when the captured image comprises a quick response (QR) code, and if the second input on the fingerprint sensor is detected within the predetermined period, performing a payment function for a product corresponding to the QR code.

14. A method for operating an electronic device, the method comprising:
displaying, on a display of the electronic device, an image captured from a camera module of the electronic device;
detecting a touch input at a position of the displayed image on the display;
receiving fingerprint information from the touch input on the fingerprint sensor superimposed on the position of the display; and
if the fingerprint information is valid and the touch input is maintained on the predetermined time, displaying a specific area having a predetermined size based on the position as an encryption area, the encryption area being restricted from being displayed while the image is displayed except for the encryption area.

15. The method of claim 14, wherein the image comprises a moving image content, an image content, or a text-based content.

16. The method of claim 14, further comprising displaying an outline of the encryption area with the image.

17. The method of claim 14, further comprising;
storing the image with encryption.

18. The method of claim 14, further comprising:
displaying an icon for indicating that the image comprises the encryption area with the image.

* * * * *